(12) United States Patent
Bi et al.

(10) Patent No.: US 12,349,115 B2
(45) Date of Patent: Jul. 1, 2025

(54) INFORMATION PROCESSING METHOD AND COMMUNICATIONS DEVICE

(71) Applicant: HUAWEI TECHNOLOGIES CO., LTD., Guangdong (CN)

(72) Inventors: Wenping Bi, Shenzhen (CN); Zheng Yu, Beijing (CN); Yubo Yang, Shanghai (CN); Xingqing Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 467 days.

(21) Appl. No.: 17/707,341

(22) Filed: Mar. 29, 2022

(65) Prior Publication Data
US 2022/0225328 A1    Jul. 14, 2022

Related U.S. Application Data

(63) Continuation of application No. PCT/CN2019/109751, filed on Sep. 30, 2019.

(51) Int. Cl.
*H04W 72/0446* (2023.01)
*H04W 72/04* (2023.01)
*H04W 72/12* (2023.01)

(52) U.S. Cl.
CPC ....... *H04W 72/0446* (2013.01); *H04W 72/12* (2013.01); *H04W 72/04* (2013.01)

(58) Field of Classification Search
CPC ............. H04W 72/0446; H04W 72/23; H04W 72/0453; H04W 72/12; H04W 72/04;
(Continued)

(56) References Cited

U.S. PATENT DOCUMENTS

2019/0058544 A1* 2/2019 Beale .................... H04L 5/0053
2019/0104558 A1* 4/2019 Wakabayashi .......... H04W 4/70
(Continued)

FOREIGN PATENT DOCUMENTS

| CN | 1738471 A | 2/2006 |
|---|---|---|
| CN | 110034844 A | 7/2019 |
| WO | 2019095983 A1 | 5/2019 |

OTHER PUBLICATIONS

LG Electronics, "Discussion on preconfigured UL resources in MTC", 3GPP TSG RAN WG1 Meeting #97 R1-1906682,may 17, 2019,total 7 pages.
(Continued)

*Primary Examiner* — Oussama Roudani
(74) *Attorney, Agent, or Firm* — WOMBLE BOND DICKINSON (US) LLP

(57) ABSTRACT

This application provides an information processing method and a communications device. An information processing method includes: a first communications device receives first information from a second communications device. The first communications device determines, based on the first information, that a start location of a first time window is a $K1^{th}$ time unit after a start location of a first resource or the start location of the first time window is a $K2^{th}$ time unit after an end location of the first resource. The first resource is a resource used by the first communications device to transmit data, and K1 and K2 are positive integers. The first communications device monitors, based on the determined start location of the first time window, control information sent by the second communications device.

19 Claims, 5 Drawing Sheets

(58) Field of Classification Search
CPC ..... H04W 76/19; H04W 72/53; H04W 16/28; H04L 5/0053; H04L 1/0013; H04L 1/0067; H04L 1/00; H04L 5/0037; H04L 5/0094; H04L 5/006; H04L 5/0007; H04L 5/0023; H04B 7/088; H04B 7/0695
See application file for complete search history.

(56) References Cited

U.S. PATENT DOCUMENTS

| | | | | |
|---|---|---|---|---|
| 2021/0083746 | A1* | 3/2021 | Huang | H04L 1/00 |
| 2021/0314779 | A1* | 10/2021 | Jiang | H04W 16/14 |
| 2022/0046597 | A1* | 2/2022 | Awad | H04W 72/23 |
| 2022/0225357 | A1* | 7/2022 | Yan | H04W 68/005 |
| 2022/0272766 | A1* | 8/2022 | Beale | H04W 74/0833 |

OTHER PUBLICATIONS

Sierra Wireless, "LTE-M Pre-configured UL Resources Design Considerations", 3GPP TSG RAN WG1 Meeting #97 R1-1906460;may 17, 2019,total 12 pages.

Sierra Wireless, "NB-IOT Pre-configured UL Resources Design Considerations", 3GPP TSG RAN WG1 Meeting #97 R1-1906461 May 17, 2019,total 10 pages.

* cited by examiner

INFORMATION PROCESSING METHOD AND COMMUNICATIONS DEVICE

CROSS-REFERENCE TO RELATED APPLICATIONS

This application is a continuation of International Application No. PCT/CN2019/109751, filed on Sep. 30, 2019, the disclosure of which is hereby incorporated by reference in its entirety.

TECHNICAL FIELD

Embodiments of this application relate to the communications field, and in particular, to an information processing method and a communications device.

BACKGROUND

A long term evolution advanced (LTE-A) system is an improved version of a long term evolution (LTE) system. The LTE-A system still continues to provide a wireless communications service for user equipment (UE) in a period of time. There are a plurality of communications systems implemented based on the LTE-A system, for example, an enhanced machine type communications (eMTC) system and another evolved system. The eMTC system still works in a frequency band provided by the LTE system.

To reduce power consumption and reduce costs, an operating bandwidth of an eMTC terminal may be relatively small. For example, the operating bandwidth of the eMTC terminal is less than an operating bandwidth of the LTE system. For example, the operating bandwidth of the eMTC terminal may be one narrowband. One narrowband includes six contiguous physical resource blocks (physical resource block, PRB), and one physical resource block includes 12 subcarriers.

In the LTE system, a base station may send downlink control information to UE. However, the UE cannot determine whether the base station sends downlink control information related to the UE, and does not learn of content of the downlink control information. Therefore, the UE may perform blind monitoring on a time-frequency resource of a search space determined by the base station, and the UE determines, through search space (SS) monitoring, whether there is downlink control information sent by the base station to the UE. A search space of the eMTC terminal appears periodically, and a start location of the search space is configured by the base station.

For a service, to reduce resource overheads and shorten a data transmission delay, the UE may transmit the service on a preconfigured resource, in other words, the UE transmits a signal on the preconfigured resource without requiring dynamic downlink control information scheduling. The preconfigured resource may be referred to as a preconfigured uplink resource (PUR). The UE may receive feedback information that indicates whether the PUR transmission succeeds and that is fed back by the base station to the UE. The UE may monitor a search space in which a control channel used by the base station to feedback whether the PUR transmission succeeds is located. For example, a time period occupied by the search space may be a search space window, and the UE may monitor the search space window.

The UE determines that a start location of the search space window may be a fourth subframe after the end of the PUR. The solution for determining a search space window is not applicable to a scenario in which early transmission termination is supported. A reason is as follows: In the scenario in which early transmission termination is supported, if the search space window starts to be monitored in the fourth subframe after the end of the PUR, uplink signal transmission of the UE may be ended, and consequently the search space window cannot be monitored.

Therefore, currently, there is no suitable solution for determining a start location of a search space window in a scenario in which early transmission termination is supported.

SUMMARY

Embodiments of this application provide an information processing method and a communications device. This implements monitoring on a first time window by a first communications device, and avoids a problem that a time window cannot be monitored.

To resolve the foregoing technical problem, the embodiments of this application provide the following technical solutions.

According to a first aspect, an embodiment of this application provides an information processing method. A first communications device receives first information from a second communications device. The first communications device determines, based on the first information, that a start location of a first time window is a $K1^{th}$ time unit after a start location of a first resource or the start location of the first time window is a $K2^{th}$ time unit after an end location of the first resource. The first resource is a resource used by the first communications device to transmit data, and K1 and K2 are positive integers. The first communications device monitors, based on the determined start location of the first time window, control information sent by the second communications device. In this solution, the second communications device may indicate, by using the first information, that the start location of the first time window is the $K1^{th}$ time unit after the start location of the first resource or the start location of the first time window is the $K2^{th}$ time unit after the end location of the first resource. Therefore, the first communications device may determine, according to the indication of the second communications device, that the start location of the first time window is the $K1^{th}$ time unit after the start location of the first resource or the start location of the first time window is the $K2^{th}$ time unit after the end location of the first resource. The start location of the first time window may be indicated by the second communications device to the first communications device. The start location of the first time window may be after the start location of the first resource. This is applicable to a case in which the first communications device monitors the first time window in an early transmission termination scenario, and avoids a problem that a time window cannot be monitored. Alternatively, the start location of the first time window may be after the end location of the first resource other than the start location of the first resource. This improves efficiency of monitoring the first time window by the first communications device.

In an embodiment, that the first communications device determines, based on the first information, that a start location of a first time window is a $K1^{th}$ time unit after a start location of a first resource or is a $K2^{th}$ time unit after an end location of the first resource includes: When the first information includes a first value, the first communications device determines that the start location of the first time window is the $K1^{th}$ time unit after the start location of the first resource, where K1 is determined by the first communications device based on the first value; or when the first information does not include the first value, the first communications device determines that the start location of the first time window is the $K2^{th}$ time unit after the end location of the first resource, where K2 is a preset value, or K2 is a value received from the second communications device. In this solution, the first information indicates the start location of the first time window in a plurality of manners. For example, the first information may include the first value, or the first information may not include the first value, and the second communications device may indicate two implementations of the start location of the first time window based on the fact indicating whether the first information includes the first value. For example, the second communications device determines that the start location of the first time window is after the start location of the first resource, and the second communications device determines that the first information includes the first value; or the second communications device determines that the start location of the first time window is after the end location of the first resource, and the second communications device determines that the first information does not include the first value. Therefore, after receiving the first information, the first communications device may monitor whether the first information includes the foregoing first value, to determine a specific implementation of the start location of the first time window in the foregoing two implementations. In this embodiment of this application, the first value may be referred to as a first parameter. The first value may be determined based on K1. For example, the second communications device predetermines K1, and then determines the first value based on K1. For example, K1 has a one-to-one correspondence with the first value, and the second communications device may determine the first value based on the correspondence.

In an embodiment, the first value is K1. In other words, the second communications device may determine that the first value is equal to K1. Therefore, if the first information includes the first value, the first communications device may obtain the first value from the first information, and the first communications device may further determine that K1 is the first value included in the first information, so that the first communications device determines that the start location of the first time window is the $K1^{th}$ time unit after the start location of the first resource.

In an embodiment, the first value is M1, and K1 is determined based on M1 and a configuration parameter of the first resource. The configuration parameter of the first resource is a parameter configured for the first resource. For example, the configuration parameter of the first resource may be a parameter configured by the second communications device for the first communications device for using the first resource. The first information may include M1. Therefore, after the first communications device obtains M1 from the first information, the first communications device may calculate K1 by using M1 and the configuration parameter of the first resource in a predetermined manner of generating K1, so that the first communications device determines that the start location of the first time window is the $K1^{th}$ time unit after the start location of the first resource.

In an embodiment, the configuration parameter of the first resource includes: a period N1 of the first resource, a repetition quantity N2 of the first resource, and a quantity N3 of time units included in the first resource; and K1 equals to M1×N1+A1, M1×N2+A2, or M1×N3+A3, where A1, A2, and A3 are preset values; or A1, A2, or A3 is a value received from the second communications device. In this solution, K1 may meet at least one of the following three relationships: M1×N1+A1, M1×N2+A2, or M1×N3+A3, where A1, A2, and A3 are preset values; or A1, A2, or A3 is a value received by the first communications device from the second communications device. For example, A1 to A3 are predetermined offsets; or A1, A2, or A3 may be a value received by the first communications device from the second communications device. For example, the first information may include A1, A2, and A3. A1, A2, and A3 may be not limited to being added to the first information, and A1, A2, and A3 may alternatively be added to other physical layer signaling or higher layer signaling. After M1×N1 is calculated, offsetting may be performed based on A1, to obtain K1. Likewise, after M1×N2 is calculated, offsetting may be performed based on A2, to obtain K1; or after M1×N3 is calculated, offsetting may be performed based on A3, to obtain K1. In this embodiment of this application, the second communications device indicates M1 to the first communications device by using the first information. Therefore, the first communications device can calculate K1, so that the first communications device determines that the start location of the first time window is the $K1^{th}$ time unit after the start location of the first resource.

In an embodiment, that the first communications device determines, based on the first information, that a start location of a first time window is a $K1^{th}$ time unit after a start location of a first resource or is a $K2^{th}$ time unit after an end location of the first resource includes: When the first information indicates that the first communications device can perform early transmission termination, the first communications device determines that the start location of the first time window is the $K1^{th}$ time unit after the start location of the first resource, where K1 is a preset value, or K1 is a value received from the second communications device; or when the first information indicates that the first communications device cannot perform early transmission termination, the first communications device determines that the start location of the first time window is the $K2^{th}$ time unit after the end location of the first resource, where K2 is a preset value, or K2 is a value received from the second communications device. In this solution, in an early transmission termination scenario, the second communications device further may indicate whether the first communications device can perform early transmission termination. Therefore, in this embodiment of this application, whether early transmission termination can be performed may be associated with the start location of the first time window, and the second communications device may indicate, to the first communications device, the fact indicating whether early transmission termination can be performed. Therefore, after the first communications device receives the first information, the first communications device may learn of the fact that is indicated by the second communications device and that indicates whether early transmission termination can be performed, and the first communications device determines, based on the association relationship between the fact indicating whether early transmission termination can be performed and the start location of the first time window, that the start location of the first time window is after the start location of the first resource or the start location of the first time window is after the end location of the first resource.

In an embodiment, the first communications device receives second information from the second communications device. The second information is used to indicate a start location of a search space of the first communications device in the first time window, and the first time window includes one or more search spaces. The first communications device determines the start location of the search space of the first communications device in the first time window based on the second information. In this solution, the first time window may include the one or more search spaces. The first communications device may monitor the start location of the search space in the first time window. The second communications device may determine the start location of the search space of the first communications device in the first time window, and then the second communications device sends the second information to the first communications device. Therefore, after receiving the second information, the first communications device may determine the start location of the search space of the first communications device in the first time window according to the indication of the second information. For example, the start location of the search space of the first communications device in the first time window may be the start location of the first time window, or the start location of the search space of the first communications device in the first time window may be a location obtained after the start location of the first time window is offset by a second value. For example, the second value may be determined based on a DMRS configuration parameter of the first communications device and/or the configuration information parameter of the first resource. Therefore, in a scenario in which a plurality of communications devices share the first resource, start locations of search spaces of the communications devices in the first time window are different, so that the plurality of communications devices are prevented from being conflicted with each other.

According to a second aspect, an embodiment of this application provides an information processing method. The method includes: A second communications device determines that a start location of a first time window used to send control information is a $K1^{th}$ time unit after a start location of a first resource or the start location of the first time window is a $K2^{th}$ time unit after an end location of the first resource. The first resource is a resource used by a first communications device to transmit data, and K1 and K2 are positive integers. The second communications device sends first information to the first communications device. The first information is used by the first communications device to determine the start location of the first time window. The second communications device sends the control information to the first communications device based on the start location of the first time window. In this solution, the second communications device may indicate, by using the first information, that the start location of the first time window is the $K1^{th}$ time unit after the start location of the first resource or the start location of the first time window is the $K2^{th}$ time unit after the end location of the first resource. Therefore, the first communications device may determine, according to the indication of the second communications device, that the start location of the first time window is the $K1^{th}$ time unit after the start location of the first resource or the start location of the first time window is the $K2^{th}$ time unit after the end location of the first resource. The start location of the first time window may be indicated by the second communications device to the first communications device. The start location of the first time window may be after the start location of the first resource. This is applicable to a case in which the first communications device monitors the first time window in an early transmission termination scenario, and avoids a problem that a time window cannot be monitored. Alternatively, the start location of the first time window may be after the end location of the first resource other than the start location of the first resource. This improves efficiency of monitoring the first time window by the first communications device.

In an embodiment, before the second communications device sends the first information to the first communications device, the method further includes: The second communications device determines that the start location of the first time window is after the start location of the first resource, the second communications device determines a first value based on K1, and the second communications device determines that the first information includes the first value; or the second communications device determines that the start location of the first time window is after the end location of the first resource, and the second communications device determines that the first information does not include the first value. In this solution, the first information indicates the start location of the first time window in a plurality of manners. For example, the first information may include the first value, or the first information may not include the first value, and the second communications device may indicate two implementations of the start location of the first time window based on the fact indicating whether the first information includes the first value. For example, the second communications device determines that the start location of the first time window is after the start location of the first resource, and the second communications device determines that the first information includes the first value; or the second communications device determines that the start location of the first time window is after the end location of the first resource, and the second communications device determines that the first information does not include the first value. Therefore, after receiving the first information, the first communications device may monitor whether the first information includes the foregoing first value, to determine a specific implementation of the start location of the first time window in the foregoing two implementations.

In an embodiment, before the second communications device sends the first information to the first communications device, the method further includes: The second communications device determines that the first information is used to indicate that the first communications device can perform early transmission termination, and the second communications device determines that the start location of the first time window is after the start location of the first resource; or the second communications device determines that the first information is used to indicate that the first communications device cannot perform early transmission termination, and the second communications device determines that the start location of the first time window is after the end location of the first resource. In this solution, in an early transmission termination scenario, the second communications device further may indicate whether the first communications device can perform early transmission termination. Therefore, in this embodiment of this application, whether early transmission termination can be performed may be associated with the start location of the first time window, and the second communications device may indicate, to the first communications device, the fact indicating whether early transmission termination can be performed. Therefore, after the first communications device receives the first information, the first communications device may learn of the fact that is indicated by the second communications device and that indicates whether early transmission termination can be performed, and the first communications device determines, based on the association relationship between the fact indicating whether early transmission termination can be performed and the start location of the first time window, that the start location of the first time window is after the start location of the first resource or the start location of the first time window is after the end location of the first resource.

In an embodiment, the method further includes: The second communications device determines a start location of a search space of the first communications device in the first time window. The first time window includes one or more search spaces. The second communications device sends second information to the first communications device. The second information is used to indicate the start location of the search space of the first communications device in the first time window. In this solution, the first communications device may monitor the start location of the search space in the first time window. The second communications device may determine the start location of the search space of the first communications device in the first time window, and then the second communications device sends the second information to the first communications device. Therefore, after receiving the second information, the first communications device may determine the start location of the search space of the first communications device in the first time window according to the indication of the second information. For example, the start location of the search space of the first communications device in the first time window may be the start location of the first time window, or the start location of the search space of the first communications device in the first time window may be a location obtained after the start location of the first time window is offset by a second value.

In an embodiment, the first information includes demodulation reference signal DMRS configuration information and/or configuration information of the first resource. The DMRS configuration information and/or the configuration information of the first resource are/is used by the first communications device to determine the start location of the first time window. The DMRS configuration information and/or the configuration information of the first resource are/is used by the first communications device to determine a length of the first time window. The DMRS configuration information and/or the configuration information of the first resource are/is configured by the second communications device for the first communications device, or the DMRS configuration information and/or the configuration information of the first resource are/is determined by the first communications device according to a predefined rule. The predefined rule may be that the first communications device performs determining based on a cell identity (cell identity). For example, a DMRS cyclic shift index is cell-ID mod x, and/or an index of the first resource is cell-ID mod y, where x and/or y are/is predefined or sent by the second communications device to the first communications device. In a scenario of sharing the first resource, the second communications device may add the DMRS configuration information to the first information. For example, the DMRS configuration information may be DMRS cyclic shift (cyclic shift) information. Therefore, after receiving the first information, the first communications device may obtain the DMRS configuration information from the first information, and determine the start location of the first time window based on the DMRS configuration information. Communications devices have different DMRS configuration information. Therefore, in a scenario in which a plurality of communications devices share the first resource, each communications device may determine a start location of a first time window that belongs to the communications device. This can avoid mutual interference caused when the plurality of communications devices perform monitoring at a start location of a same time window, resolve a problem of a time window collision in the shared resource, improve system reliability, and increase resource utilization.

In an embodiment, the length of the first time window meets $P1 \times Ld + B1$ or $P2 \times Ld + B2$, where P1 is a maximum cyclic shift index value indicated by the DMRS configuration information or a cyclic shift index value configured by the second communications device for the first communications device; P2 is a maximum communications device quantity that is indicated by the resource configuration information and that is for the first communications device configured with the first resource, or is a resource index configured by the second communications device for the first communications device; Ld is a search space length of the first communications device or a predefined search space length; and B1 and B2 are preset values; or B1 or B2 is a value received from the second communications device. In this solution, the first information includes the DMRS configuration information. The DMRS configuration information indicates P1, and P1 may be the maximum cyclic shift index value of the first communications device (that is, a maximum quantity of cyclic shifts), or the cyclic shift index value configured by the second communications device for the first communications device (that is, a quantity of cyclic shifts configured by the second communications device for the first communications device). The first communications device may obtain the length of the first time window by using P1 in a predetermined manner of calculating the length of the first time window. The first information may further include the configuration information of the first resource. The configuration information of the first resource indicates P2, and P2 may be the maximum communications device quantity for the first communications device, or may be a resource index for configuring the first resource for the first communications device. The first communications device may obtain the length of the first time window by using P2 in the predetermined manner of calculating the length of the first time window. P1 may alternatively be the maximum quantity of cyclic shift indexes, or the maximum quantity of cyclic shift configuration parameters, or the quantity of cyclic shift configuration parameters. A manner of determining P1 may be configured based on a specific scenario.

In an embodiment, K1 equals to $q + i \times Ld$ or $q + j \times Ld$; and/or K2 meets $q + i \times Ld$ or $q + j \times Ld$, where q is a predefined integer greater than or equal to 0, or is a value received from the second communications device; i is a resource index of the first communications device; j is a DMRS cyclic shift index of the first communications device; and Ld is the search space length of the first communications device or the predefined search space length. In this solution, in a scenario in which a plurality of communications devices share the first resource, each communications device may determine a start location of a first time window that belongs to the communications device. Therefore, the second communications device may configure a start location of a first time window for each first communications device. This can avoid mutual interference caused when the plurality of communications devices perform monitoring at a start location of a same time window, resolve a problem of a time window collision in the shared resource, improve system reliability, and increase resource utilization.

According to a third aspect, an embodiment of this application further provides a communications device. The communications device is a first communications device. The first communications device includes a processing module and a transceiver module. The transceiver module is configured to receive first information from a second communications device. The processing module is configured to determine, based on the first information, that a start location of a first time window is a $K1^{th}$ time unit after a start location of a first resource or the start location of the first time window is a $K2^{th}$ time unit after an end location of the first resource, where the first resource is a resource used by the first communications device to transmit data, and K1 and K2 are positive integers. The transceiver module is further configured to monitor, based on the determined start location of the first time window, control information sent by the second communications device.

In an embodiment, the processing module is configured to: when the first information includes a first value, determine that the start location of the first time window is the $K1^{th}$ time unit after the start location of the first resource, where K1 is determined by the first communications device based on the first value; or when the first information does not include the first value, determine that the start location of the first time window is the $K2^{th}$ time unit after the end location of the first resource, where K2 is a preset value, or K2 is a value received from the second communications device.

In an embodiment, the first value is K1.

In an embodiment, the first value is M1, and K1 is determined based on M1 and a configuration parameter of the first resource.

In an embodiment, the configuration parameter of the first resource includes: a period N1 of the first resource, a repetition quantity N2 of the first resource, and a quantity N3 of time units included in the first resource; and K1 equals to M1×N1+A1, M1×N2+A2, or M1×N3+A3, where A1, A2, and A3 are preset values; or A1, A2, or A3 is a value received from the second communications device.

In an embodiment, the processing module is configured to: when the first information indicates that the first communications device can perform early transmission termination, determine that the start location of the first time window is the $K1^{th}$ time unit after the start location of the first resource, where K1 is a preset value, or K1 is a value received from the second communications device; or when the first information indicates that the first communications device cannot perform early transmission termination, determine that the start location of the first time window is the $K2^{th}$ time unit after the end location of the first resource, where K2 is a preset value, or K2 is a value received from the second communications device.

In an embodiment, the transceiver module is further configured to receive second information from the second communications device, where the second information is used to indicate a start location of a search space of the first communications device in the first time window, and the first time window includes one or more search spaces; and the processing module is further configured to determine the start location of the search space of the first communications device in the first time window based on the second information.

In the third aspect of this application, the composition modules of the first communications device may further perform the operations described in the foregoing first aspect and various possible implementations. For details, refer to the descriptions in the foregoing first aspect and various possible implementations.

According to a fourth aspect, an embodiment of this application further provides a communications device. The communications device is a second communications device. The second communications device includes a processing module and a transceiver module. The processing module is configured to determine that a start location of a first time window used to send control information is a $K1^{th}$ time unit after a start location of a first resource or the start location of the first time window is a $K2^{th}$ time unit after an end location of the first resource, where the first resource is a resource used by a first communications device to transmit data, and K1 and K2 are positive integers. The transceiver module is configured to send first information to the first communications device, where the first information is used by the first communications device to determine the start location of the first time window. The transceiver module is further configured to send the control information to the first communications device based on the start location of the first time window.

In an embodiment, the processing module is further configured to: before the transceiver module sends the first information to the first communications device, determine that the start location of the first time window is after the start location of the first resource, determine a first value based on K1, and determine that the first information includes the first value; or determine that the start location of the first time window is after the end location of the first resource, and determine that the first information does not include the first value.

In an embodiment, the processing module is further configured to: before the transceiver module sends the first information to the first communications device, determine that the first information is used to indicate that the first communications device can perform early transmission termination, and determine that the start location of the first time window is after the start location of the first resource; or determine that the first information is used to indicate that the first communications device cannot perform early transmission termination, and determine that the start location of the first time window is after the end location of the first resource.

In an embodiment, the processing module is further configured to determine a start location of a search space of the first communications device in the first time window, where the first time window includes one or more search spaces; and the transceiver module is further configured to send second information to the first communications device, where the second information is used to indicate the start location of the search space of the first communications device in the first time window.

In an embodiment, the first information includes demodulation reference signal DMRS configuration information and/or configuration information of the first resource. The DMRS configuration information and/or the configuration information of the first resource are/is used by the first communications device to determine the start location of the first time window. The DMRS configuration information and/or the configuration information of the first resource are/is used by the first communications device to determine a length of the first time window.

In an embodiment, the length of the first time window meets P1×Ld+B1 or P2×Ld+B2, where P1 is a maximum cyclic shift index value indicated by the DMRS configuration information or a cyclic shift index value configured by the second communications device for the first communications device; P2 is a maximum communications device quantity that is indicated by the resource configuration information and that is for the first communications device configured with the first resource, or is a resource index configured by the second communications device for the first communications device; Ld is a search space length of the first communications device or a predefined search space length; and B1 and B2 are preset values; or B1 or B2 is a value received from the second communications device.

In an embodiment, K1 equals to q+i×Ld or q+j ×Ld; and/or K2 meets q+i×Ld or q+j×Ld, where q is a predefined integer greater than or equal to 0, or is a value received from the second communications device; i is a resource index of the first communications device; j is a DMRS cyclic shift index of the first communications device; and Ld is the search space length of the first communications device or the predefined search space length.

In the fourth aspect of this application, the composition modules of the second communications device may further perform the operations described in the foregoing second aspect and various possible implementations. For details, refer to the descriptions in the foregoing second aspect and various possible implementations.

According to a fifth aspect, an embodiment of this application provides a computer-readable storage medium. The computer-readable storage medium stores instructions, and when the instructions are run on a computer, the computer is enabled to perform the method according to the first aspect or the second aspect.

According to a sixth aspect, an embodiment of this application provides a computer program product including instructions. When the computer program product runs on a computer, the computer is enabled to perform the method according to the first aspect or the second aspect.

According to a seventh aspect, an embodiment of this application provides a communications device. The communications device may include an entity, for example, a terminal device or a network device. The communications device includes a processor and a memory. The memory is configured to store instructions. The processor is configured to execute the instructions in the memory, to enable the communications device to perform the method according to the first aspect or the second aspect.

According to an eighth aspect, an embodiment of this application provides a chip system. The chip system includes a processor, configured to support a communications device in implementing the functions in the foregoing aspects, for example, sending or processing data and/or information in the foregoing methods. In a possible design, the chip system further includes a memory. The memory is configured to store program instructions and data for the communications device. The chip system may include a chip, or may include a chip and another discrete component.

According to a ninth aspect, an embodiment of this application provides a communications device. The communications device includes a processor and a communications interface. The communications interface is configured to: receive a signal from another communications device other than the communications device and transmit the signal to the processor, or send a signal from the processor to another communications device other than the communications device. The processor is configured to implement the method according to the first aspect or the second aspect by using a logical circuit or executable code instructions.

DESCRIPTION OF EMBODIMENTS

Figure 1:
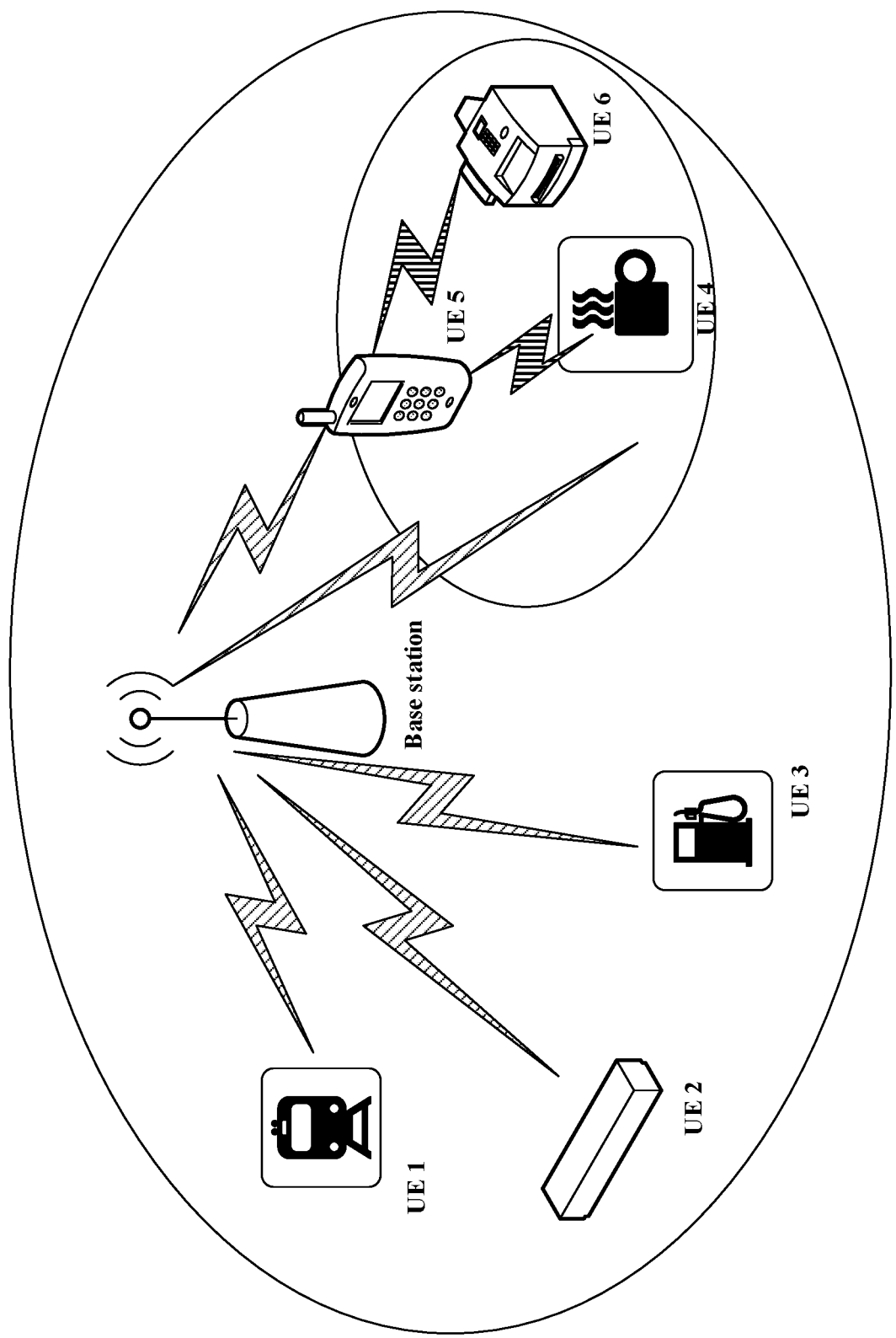
FIG. 1 is a schematic diagram of a system architecture of an information processing method according to an embodiment of this application.

The embodiments of this application provide an information processing method and a communications device. This implements monitoring on a first time window by a first communications device, and avoids a problem that a time window cannot be monitored.

The following describes the embodiments of this application with reference to accompanying drawings.

In the specification, claims, and the accompanying drawings of this application, the terms "first", "second", and the like are intended to distinguish similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "have", and any other variations thereof are intended to cover the non-exclusive inclusion, so that a process, method, system, product, or device that includes a series of units is not limited to those units, but may include other units not expressly listed or inherent to such a process, method, product, or device.

The technical solutions in the embodiments of this application may be applied to various communications systems for data processing, for example, a code division multiple access (CDMA) system, a time division multiple access (time division multiple acccess, (TDMA) system, a frequency division multiple access (FDMA) system, an orthogonal frequency division multiple access (OFDMA) system, a single carrier frequency division multiple access (SC-FDMA) system, and another system. Terms "system" and "network" may be interchanged with each other. The CDMA system may implement wireless technologies such as universal terrestrial radio access (UTRA) and CDMA2000. The UTRA may include a wideband CDMA (WCDMA) technology and another variant technology of CDMA. CDMA2000 may cover the interim standard (IS) 2000 (IS-2000), the IS-95 standard, and the IS-856 standard. The TDMA system may implement wireless technologies such as a global system for mobile communications (GSM). The OFDMA system may implement wireless technologies such as evolved universal terrestrial radio access (E UTRA), ultra mobile broadband (UMB), IEEE 802.11 (Wi-Fi), IEEE 802.16 (WiMAX), IEEE 802.20, and Flash OFDMA. The UTRA corresponds to a UMTS, and the E-UTRA corresponds to an evolved version of the UMTS. A new version of the UMTS that uses the E-UTRA is used in long term evolution (long term evolution, LTE) and various versions evolved based on LTE in 3GPP. A fifth generation ("5G" for short) communications system, a new radio ("NW" for short), and a sixth generation (6G) mobile communications system are next-generation communications systems being studied. The technical solutions in the embodiments of this application may be applied to various communications systems such as V2X, LTE-V, V2V, internet of vehicles, MTC, IoT, LTE-M, and M2M. In addition, the communications system may be further applied to a future-oriented communications technology, and is applicable to the technical solutions provided in the embodiments of this application. A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of a network architecture and emergence of a new service scenario, the technical solutions provided in the embodiments of this application are also applicable to similar technical problems.

The communications system provided in the embodiments of this application may include a first communications device and a second communications device, and data transmission may be performed between the first communications device and the second communications device. For example, the first communications device may include a terminal device, and the second communications device may include a network device. Alternatively, the first communications device may include one terminal device, and the second communications device may include another terminal device. Alternatively, the first communications device may include one network device, and the second communications device may include another network device.

FIG. 1 is a schematic diagram of a structure of a possible radio access network (RAN) according to an embodiment of this application. The RAN may be a base station access system in a 2G network (to be specific, the RAN includes a base station and a base station controller), a base station access system in a 3G network (to be specific, the RAN includes a base station and an RNC), a base station access system in a 4G network (to be specific, the RAN includes an eNB and an RNC), or a base station access system in a 5G network.

The RAN includes one or more network devices. The network device may be any device having a wireless transceiver function, or a chip disposed in a device having a wireless transceiver function. The network device includes but is not limited to a base station (for example, a base station BS, a NodeB, an evolved NodeB eNodeB or eNB, a gNodeB or gNB in a 5th generation 5G communications system, a base station in a future communications system, an access node in a Wi-Fi system, a wireless relay node, or a wireless backhaul node) and the like. The base station may be a macro base station, a micro base station, a picocell base station, a small cell, a relay station, or the like. A plurality of base stations may support a network using the foregoing one or more technologies, or a future evolved network. A core network may support a network using the foregoing one or more technologies, or a future evolved network. The base station may include one or more co-site or non-co-site transmission reception points (TRP). The network device may alternatively be a radio controller, a centralized unit (CU), a distributed unit (DU), or the like in a cloud radio access network (CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with terminal devices 1 to 6, or may communicate with the terminal devices 1 to 6 through a relay station. The terminal devices 1 to 6 may support communication with a plurality of base stations using different technologies. For example, the terminal devices may support communication with a base station supporting an LTE network, may support communication with a base station supporting the 5G network, or may support a dual connection to a base station in an LTE network and a base station in the 5G network. For example, the terminals are connected to a RAN node of a wireless network. Currently, for example, the RAN node is a gNB, a transmission reception point (TRP), an evolved NodeB (eNB), a radio network controller (RNC), a NodeB (NodeB, NB), a base station controller (BSC), a base transceiver station (BTS), a home NodeB (for example, a home evolved NodeB or home NodeB, (HNB), a baseband unit (BBU), a wireless fidelity (Wi-Fi) access point (AP), or the like. In a network structure, the network device may include a centralized unit (CU) node, a distributed unit (DU) node, or a RAN device including a CU node and a DU node.

The terminal devices 1 to 6 each are also referred to as UE (UE, UE), a mobile station (MS), a mobile terminal (MT), a terminal, or the like, and is a device that provides voice and/or data connectivity for a user, or is a chip disposed in the device, for example, a handheld device or a vehicle-mounted device having a wireless connection function. Currently, for example, the terminal device is a mobile phone (mobile phone), a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. The terminal device provided in the embodiments of this application may be a low-complexity terminal device and/or a terminal device in a coverage enhancement mode A.

In the embodiments of this application, the base station and UE 1 to UE 6 form a communications system. In the communications system, the base station sends one or more of system information, an RAR message, or a paging message to one or more of the UE 1 to the UE 6. In addition, the UE 4 to the UE 6 also form a communications system. In the communications system, the UE 5 may function as a base station, and the UE 5 may send one or more of system information, control information, and a paging message to one or more of the UE 4 and the UE 6.

In this application, transmission may be sending or receiving. When one side of the communication performs sending, a peer device of the communication performs receiving. ATB may be a TB for uplink transmission, or may be a TB for downlink transmission.

A resource in the embodiments of this application may be a symbol, a slot, a short slot, a subframe, or the like. Alternatively, a resource in the embodiments of this application may be a subcarrier, a resource block, a carrier, a channel control element, or the like.

In the embodiments of this application, when a resource is a symbol, a time unit may be a slot, a short slot, or a subframe. Alternatively, in the embodiments of this application, when a resource is a subcarrier, a time unit is a resource block, a carrier, a channel control element, or the like.

Figure 2:
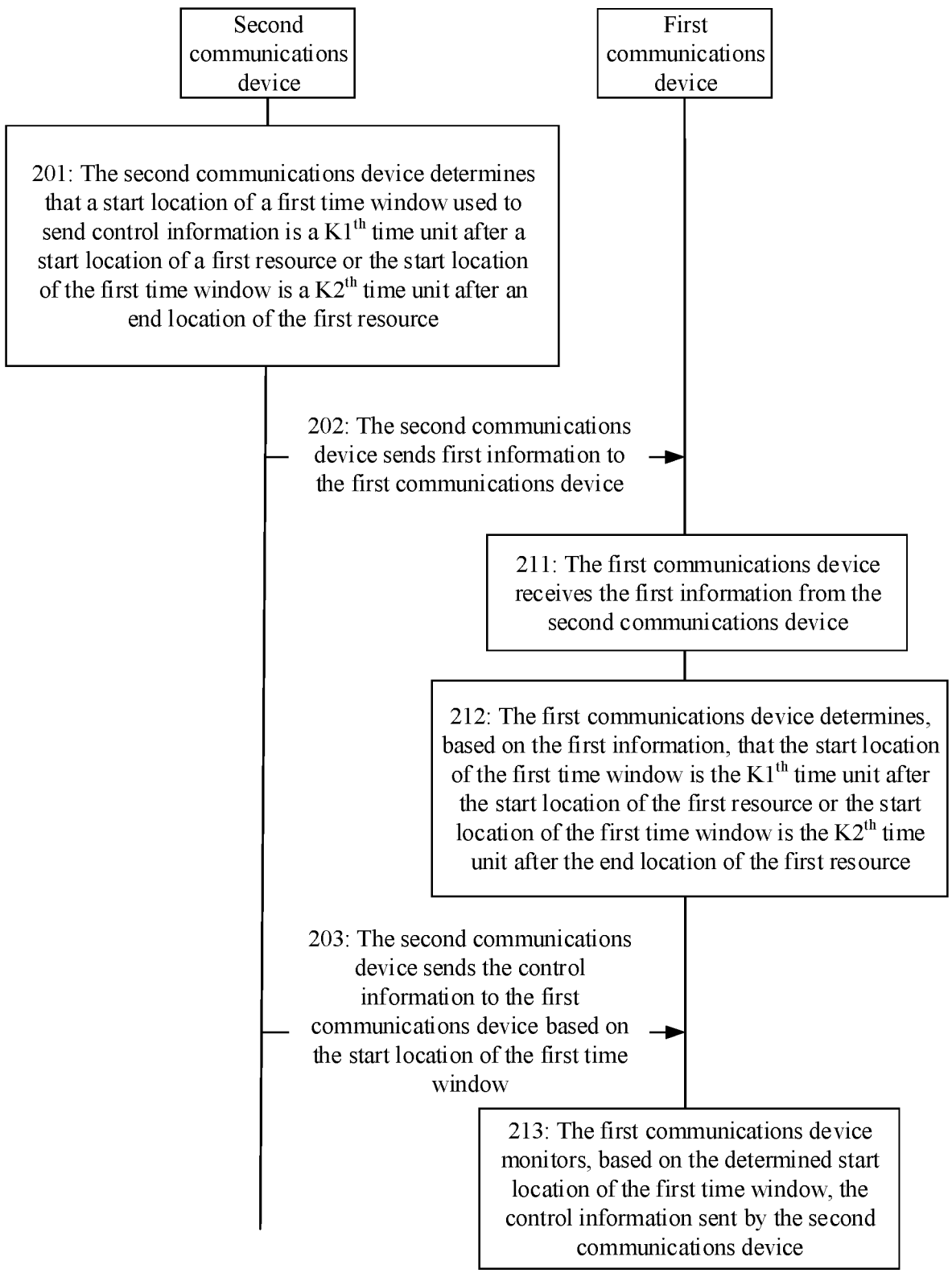
FIG. 2 is a schematic diagram of an interaction procedure of an information processing method according to an embodiment of this application.

FIG. 2 is a schematic diagram of an interaction procedure of an information processing method according to an embodiment of this application. For example, a first communications device may be the foregoing terminal device, and a second communications device may be the foregoing network device. According to the information processing method provided in this embodiment of this application, operation 201 to operation 203 are described below from the perspective of the network device, and operation 211 to operation 213 are described below from the perspective of the terminal device. The information processing method mainly includes the following operations.

201: The second communications device determines that a start location of a first time window used to send control information is a $K1^{th}$ time unit after a start location of a first resource or the start location of the first time window is a $K2^{th}$ time unit after an end location of the first resource, where the first resource is a resource used by the first communications device to transmit data, and K1 and K2 are positive integers.

In an embodiment of this application, the first time window is used by the second communications device to send the control information, and the second communications device may determine the start location of the first time window. A time window may also be referred to as a time period (or time duration). For example, the time window may be a search space window, a monitoring time window, or a control information monitoring (monitoring) time window. The first search time window means that the second communications device may send the control information in the time period (or in the time window), and the first communications device monitors, in the time period, the control information sent by the second communications device. The first time window may include one or more search spaces, and the second communications device may send the control information to the first communications device in the search space in the first time window. A search space is a set of time resources and frequency resources, and the second communications device may send the control information to the first communications device in a time resource and a frequency resource that are allocated by the search space. The start location of the first time window is a start location at which the first communications device may monitor the control information. In other words, the first communications device may monitor the control information or monitor the search space at the start location of the first time window, or the first communications device may start to monitor the control information in the search space at the start location of the first time window.

In an embodiment of this application, the second communications device determines that the start location of the first time window has a plurality of implementations. For example, the start location of the first time window may be determined based on the first resource. The first resource is a resource used by the first communications device to transmit data. The first resource may be a resource preconfigured by the second communications device. For example, the first resource may be the foregoing PUR. The first resource may be a user-specific preconfigured resource, or the first resource may be a preconfigured resource shared by a plurality of users. The first resource has the start location and the end location. The start location of the first resource is a time location and/or a frequency location of the first resource at which the second communications device starts data sending, and the end location of the first resource is a time location and/or a frequency location of the first resource at which the second communications device ends sending. For another example, the start location of the first resource is a first time unit included in the first resource or a start location of the first time unit included in the first resource, and the end location of the first resource is a last time unit included in the first resource or -an end location of the last time unit included in the first resource.

It should be noted that the first resource may be a resource used by the first communications device to transmit uplink data, or the first resource may be a preconfigured uplink resource (PUR). The PUR is merely an example name. Essentially, a network device configures the resource, and the first communications device may transmit uplink information on the resource without requiring dynamic scheduling or downlink control information scheduling by the second communications device. The resource may alternatively have another name. For example, the resource may be a configuration grant resource. If the configuration grant resource may also implement a function implemented by the preconfigured uplink resource in this embodiment of this application, the configuration grant resource may also be understood as the preconfigured uplink resource in this embodiment of this application.

In an embodiment of this application, the start location of the first time window may be a time unit after the start location of the first resource. For example, the start location of the first time window is the $K1^{th}$ time unit after the start location of the first resource, and K1 indicates a quantity of time units. For example, if K1 is equal to 6, it indicates that the start location of the first time window is a sixth time unit after the start location of the first resource.

In some embodiments of this application, the $K1^{th}$ time unit after the start location of the first resource may be a first time unit after a quantity "first value" of time units after the start location of the first resource. The first value is X1. The first value may be sent by the second communications device to the first communications device, or may be predefined. The first communications device determines that the first time unit after the X1 time units after the start location of the first resource is the $K1^{th}$ time unit after the start location of the first resource. Alternatively, the $K1^{th}$ time unit after the start location of the first resource may be a first valid time unit after the X1 time units after the start location of the first resource. The first communications device determines that the first valid time unit after the X1 time units after the start location of the first resource is the $K1^{th}$ time unit after the start location of the first resource. A valid time unit may be a bandwidth-reduced low-complexity and coverage enhanced (BL/CE) subframe.

Alternatively, the start location of the first time window may be a time unit after the end location of the first resource. For example, the start location of the first time window is the $K2^{th}$ time unit after the end location of the first resource, and K2 indicates a quantity of time units. For example, if K2 is equal to 4, it indicates that the start location of the first time window is a fourth time unit after the end location of the first resource. For another example, K1 may be equal to K2, or K1 may not be equal to K2. Specifically, K1 and K2 need to be determined based on an application scenario.

In some embodiments of this application, the $K2^{th}$ time unit after the end location of the first resource may be a first time unit after X2 time units after the end location of the first resource. The first value is X2. The first value may be sent by the second communications device to the first communications device, or may be predefined. The first communications device determines that the first time unit after the X2 time units after the end location of the first resource is the $K2^{th}$ time unit after the end location of the first resource. Alternatively, the $K2^{th}$ time unit after the end location of the first resource may be a first valid time unit after the X2 time units after the end location of the first resource. The first communications device determines that the first valid time unit after the X2 time units after the end location of the first resource is the $K2^{th}$ time unit after the end location of the first resource. A valid time unit may be a BL/CE subframe.

In an embodiment of this application, the start location of the first time window may be after the start location of the first resource. This is applicable to a case in which the first communications device monitors the first time window in an early transmission termination scenario. In other words, the first communications device may monitor the first time window when a transmission starts on the first resource. This avoids a problem that a time window cannot be monitored. Alternatively, the start location of the first time window may be after the end location of the first resource other than the start location of the first resource. This improves efficiency of monitoring the first time window by the first communications device, and improves flexibility of configuring the first time window.

202: The second communications device sends first information to the first communications device, where the first information is used by the first communications device to determine the start location of the first time window.

In an embodiment of this application, after the second communications device determines the first information by performing operation 201, the second communications device may send the first information to the first communications device, so that the first communications device can receive the first information from the second communications device, and the first communications device can parse the first information to determine the start location of the first time window that is indicated by the second communications device.

In some embodiments of this application, before operation 202 in which the second communications device sends first information to the first communications device, the information processing method provided in this embodiment of this application further includes the following operations:

The second communications device determines that the start location of the first time window is after the start location of the first resource, the second communications device determines the first value based on K1, and the second communications device determines that the first information includes the first value; or the second communications device determines that the start location of the first time window is after the end location of the first resource, and the second communications device determines that the first information does not include the first value.

The first information indicates the start location of the first time window in a plurality of manners. For example, the first information may include the first value, or the first information may not include the first value, and the second communications device may indicate two implementations of the start location of the first time window based on the fact indicating whether the first information includes the first value. For example, the second communications device determines that the start location of the first time window is after the start location of the first resource, and the second communications device determines that the first information includes the first value; or the second communications device determines that the start location of the first time window is after the end location of the first resource, and the second communications device determines that the first information does not include the first value. Therefore, after receiving the first information, the first communications device may monitor whether the first information includes the foregoing first value, to determine a specific implementation of the start location of the first time window in the foregoing two implementations. In this embodiment of this application, the first value may be referred to as a first parameter. The first parameter may be determined based on K1. For example, the second communications device predetermines K1, and then determines the first parameter based on K1. For example, K1 has a one-to-one correspondence with the first parameter, and the second communications device may determine the first parameter based on the correspondence.

Further, in some embodiments of this application, the first value is K1, in other words, the second communications device may determine that the first value is equal to K1. Therefore, if the first information includes the first value, the first communications device may obtain the first value from the first information, and the first communications device may further determine that K1 is the first value included in the first information, so that the first communications device determines that the start location of the first time window is the $K1^{th}$ time unit after the start location of the first resource.

In some embodiments of this application, the first value is X1. The first value may be sent by the second communications device to the first communications device. The first communications device determines that the first time unit after the X1 time units after the start location of the first resource is the $K1^{th}$ time unit after the start location of the first resource; or the first communications device determines that the first valid time unit after the X1 time units after the start location of the first resource is the $K1^{th}$ time unit after the start location of the first resource. A valid time unit may be a BL/CE subframe.

In some other embodiments of this application, the first value is M1, and M1 is greater than or equal to 0 and less than or equal to 1. K1 is determined based on M1 and a configuration parameter of the first resource. The configuration parameter of the first resource is a parameter configured for the first resource. For example, the configuration parameter of the first resource may be a parameter configured by the second communications device for the first communications device for using the first resource. The first information may include M1. Therefore, after the first communications device obtains M1 from the first information, the first communications device may calculate K1 by using M1 and the configuration parameter of the first resource in a predetermined manner of generating K1 or X1, so that the first communications device determines that the start location of the first time window is the $K1^{th}$ time unit after the start location of the first resource.

Further, in some embodiments of this application, the configuration parameter of the first resource includes at least one of the following parameters: a period N1 of the first resource, a repetition quantity N2 of the first resource, and a quantity N3 of time units included in the first resource. N1 may be the period of the first resource that is configured by the second communications device, N2 is the repetition quantity of the first resource that is configured by the second communications device, and N3 is the quantity that is of time units included in the first resource and that is configured by the second communications device. Therefore, the first communications device may obtain K1 by using N1, N2, or N3 in the predetermined manner of generating K1.

For example, K1 may meet at least one of the following three relationships: M1×N1+A1, M1×N2+A2, or M1×N3+A3, where A1, A2, and A3 are preset values; or A1, A2, or A3 is a value received by the first communications device from the second communications device. For example, A1 to A3 are predetermined offsets. For another example, X1 may meet at least one of the following three relationships: M1×N1+A1, M1×N2+A2, or M1×N3+A3. For example, after M1×N1 is calculated, offsetting may be performed based on A1, to obtain K1. Likewise, after M1×N2 is calculated, offsetting may be performed based on A2, to obtain K1; or after M1×N3 is calculated, offsetting may be performed based on A3, to obtain K1. In this embodiment of this application, the second communications device indicates M1 to the first communications device by using the first information. Therefore, the first communications device can calculate K1, so that the first communications device determines that the start location of the first time window is the $K1^{th}$ time unit after the start location of the first resource.

It should be noted that, because M1 is greater than or equal to 0 and less than or equal to 1, K1 is calculated based on M1×N1+A1, M1×N2+A2, M1×N3+A3, or the like. Therefore, when transmission channel quality of the first communications device is relatively poor, the first communications device may perform a plurality of repeated transmissions to achieve success in transmission. Currently, the first communications device further may monitor a search space window on a fourth subframe after the end of the PUR. In this case, the first communications device may monitor the search space window for a very long time before receiving downlink control information of the second communications device. Consequently, power consumption of the first communications device is greatly wasted. Because M1 is greater than 0 and less than or equal to 1, the first time window starts to be monitored on an (M1×N1+A1)th time unit, an (M1×N2+A2)th time unit, or an $(M1×N3+A3)^{th}$ time unit after the start location of the first resource. Therefore, power consumption of the first communications device is not wasted.

Another similar manner may alternatively be used on a basis of the foregoing manner of calculating K1 or X1. For example, K1 or X1 meets M1×(N1+A1), M1×(N2+A2), or M1×(N3+A3). Values of A1 to A3 are not limited.

In some other embodiments of this application, the first value is M1, and M1 is greater than or equal to 0 and less than or equal to 1. X1 is determined based on M1 and the configuration parameter of the first resource. The configuration parameter of the first resource is a parameter configured for the first resource. For example, the configuration parameter of the first resource may be a parameter configured by the second communications device for the first communications device for using the first resource. The first information may include M1. Therefore, after the first communications device obtains M1 from the first information, the first communications device may calculate X1 by using M1 and the configuration parameter of the first resource in the predetermined manner of generating K1 or X1, so that the first communications device determines that the start location of the first time window is the first valid time unit after the X1 time units after the start location of the first resource, that is, the $K1^{th}$ time unit. The first time unit after the X1 time units after the start location of the first resource is the $K1^{th}$ time unit after the start location of the first resource; or the first valid time unit after the X1 time units after the start location of the first resource is the $K1^{th}$ time unit after the start location of the first resource. The first communications device determines that the first valid time unit after the X1 time units after the start location of the first resource is the $K1^{th}$ time unit after the start location of the first resource. A valid time unit may be a BL/CE subframe.

Further, in some embodiments of this application, the configuration parameter of the first resource includes at least one of the following parameters: a period N1 of the first resource, a repetition quantity N2 of the first resource, and a quantity N3 of time units included in the first resource. N1 may be the period of the first resource that is configured by the second communications device, N2 is the repetition quantity of the first resource that is configured by the second communications device, and N3 is the quantity that is of time units included in the first resource and that is configured by the second communications device. Therefore, the first communications device may obtain X1 by using N1, N2, or N3 in the predetermined manner of generating X1.

For example, X1 may meet at least one of the following three relationships: M1×N1+A1, M1×N2+A2, or M1×N3+A3. For example, after M1×N1 is calculated, offsetting may be performed based on A1, to obtain X1. Likewise, after M1×N2 is calculated, offsetting may be performed based on A2, to obtain X1; or after M1×N3 is calculated, offsetting may be performed based on A3, to obtain X1. In this embodiment of this application, the second communications device indicates M1 to the first communications device by using the first information. Therefore, the first communications device can calculate K1, so that the first communications device determines that the start location of the first time window is the $K1^{th}$ time unit after the start location of the first resource.

It should be noted that, because M1 is greater than or equal to 0 and less than or equal to 1, X1 is calculated based on M1×N1+A1, M1×N2+A2, M1×N3+A3, or the like. Therefore, when transmission channel quality of the first communications device is relatively poor, the first communications device may perform a plurality of repeated transmissions to achieve success in transmission. Currently, the first communications device further may monitor a search space window on a fourth subframe after the end of the PUR. In this case, the first communications device may monitor the search space window for a very long time before receiving downlink control information of the second communications device. Consequently, power consumption of the first communications device is greatly wasted. Because M1 is greater than 0 and less than or equal to 1, the first time window starts to be monitored on a first valid subframe after (M1×N1+A1) time units, (M1×N2+A2) time units, or (M1×N3+A3) time units after the start location of the first resource. Therefore, power consumption of the first communications device is not wasted.

Another similar manner may alternatively be used on a basis of the foregoing manner of calculating X1. For example, X1 meets M1×(N1+A1), M1×(N2+A2), or M1×(N3+A3). Values of A1 to A3 are not limited.

In some embodiments of this application, before operation 202 in which the second communications device sends first information to the first communications device, the information processing method provided in this embodiment of this application further includes the following operations:

The second communications device determines that the first information is used to indicate that the first communications device can perform early transmission termination, and the second communications device determines that the start location of the first time window is after the start location of the first resource; or the second communications device determines that the first information is used to indicate that the first communications device cannot perform early transmission termination, and the second communications device determines that the start location of the first time window is after the end location of the first resource.

In an early transmission termination scenario, the second communications device further may indicate whether the first communications device can perform early transmission termination. Therefore, in an embodiment of this application, whether early transmission termination can be performed may be associated with the start location of the first time window, and the second communications device may indicate, to the first communications device, the fact indicating whether early transmission termination can be performed. Therefore, after the first communications device receives the first information, the first communications device may learn of the fact that is indicated by the second communications device and that indicates whether early transmission termination can be performed, and the first communications device determines, based on the association relationship between the fact indicating whether early transmission termination can be performed and the start location of the first time window, that the start location of the first time window is after the start location of the first resource or the start location of the first time window is after the end location of the first resource.

In an embodiment of this application, "whether early transmission termination can be performed" may also be referred to as "whether early transmission termination can be enabled", and enabling early termination may also be understood as that the second communications device (e.g., E-UTRAN) indicates that the second communications device may send an uplink HARQ-ACK (hybrid automatic repeat request-acknowledge) feedback or an uplink grant for a new transmission to complete acknowledgment for early termination of a PUSCH transmission or an explicit PUSCH (physical uplink shared channel) transmission. The second communications device may indicate whether a function of performing early transmission termination is enabled, so that the first communications device can determine the start location of the first time window. Therefore, the second communications device does not need to separately indicate the start location of the first time window. This reduces signaling overheads, and improves performance of a communications system.

In some embodiments of this application, the first information may alternatively be dedicated information that is generated by the second communications device and that is used to indicate the start location of the first time window. For example, the first information indicates that the start location of the first time window is after the start location of the first resource; or the first information indicates that the start location of the first time window is after the end location of the first resource. Therefore, the first communications device may receive the first information from the second communications device, and the first communications device determines, based on indication content included in the first information, that the start location of the first time window is after the start location of the first resource or the start location of the first time window is after the end location of the first resource.

In a scenario in which a plurality of first communications devices share the first resource, the first resource may be a preconfigured resource shared by a plurality of users. For example, the scenario of sharing the first resource may be a PUR sharing scenario in which a plurality of users share one PUR resource. If each of start locations of search space windows is a fourth subframe after the end of the PUR, the search spaces of the plurality of users are collided, reliability of a control channel is reduced, and user power and system resources are wasted.

In some embodiments of this application, in the scenario of sharing the first resource, demodulation reference signal (DMRS) indexes of all communications devices are different and/or resource indexes of all the communications devices are different. Therefore, the second communications device may use a DMRS index and/or a resource index to indicate a start location of a first time window that is available to each communications device. Specifically, the first information includes DMRS configuration information and/or configuration information of the first resource.

The DMRS configuration information and/or the configuration information of the first resource are/is used by the first communications device to determine the start location of the first time window.

The DMRS configuration information and/or the configuration information of the first resource are/is used by the first communications device to determine a length of the first time window.

The DMRS configuration information and/or the configuration information of the first resource are/is configured by the second communications device for the first communications device, or the DMRS configuration information and/or the configuration information of the first resource are/is determined by the first communications device according to a predefined rule. The predefined rule may be that the first communications device performs determining based on a cell identity (cell identity). For example, a DMRS cyclic shift index is cell-ID mod x, and/or an index of the first resource is cell-ID mod y, where x and/or y are/is predefined or sent by the second communications device to the first communications device. In the scenario of sharing the first resource, the second communications device may add the DMRS configuration information to the first information. For example, the DMRS configuration information may be DMRS cyclic shift information. Therefore, after receiving the first information, the first communications device may obtain the DMRS configuration information from the first information, and determine the start location of the first time window based on the DMRS configuration information. Communications devices have different DMRS configuration information. Therefore, in a scenario in which a plurality of communications devices share the first resource, each communications device may determine a start location of a first time window that belongs to the communications device. This can avoid mutual interference caused when the plurality of communications devices perform monitoring at a start location of a same time window, resolve a problem of a time window collision in the shared resource, improve system reliability, and increase resource utilization.

In the scenario of sharing the first resource, the second communications device may add the configuration information of the first resource to the first information. For example, the configuration information of the first resource may be a resource index configured by the second communications device for the first communications device. Therefore, after receiving the first information, the first communications device may obtain the configuration information of the first resource from the first information, and determine the start location of the first time window based on the configuration information of the first resource. Communications devices have different configuration information of the first resource. Therefore, in a scenario in which a plurality of communications devices share the first resource, each communications device may determine a start location of a first time window that belongs to the communications device. This can avoid mutual interference caused when the plurality of communications devices perform monitoring at a start location of a same time window, resolve a problem of a time window collision in the shared resource, improve system reliability, and increase resource utilization.

In some embodiments of this application, the length of the first time window meets P1×Ld+B1 or P2×Ld+B2.

P1 is a maximum cyclic shift index value indicated by the DMRS configuration information, or a cyclic shift index value configured by the second communications device for the first communications device, or a maximum quantity of cyclic shift indexes, or a maximum quantity of cyclic shift configuration parameters, or a quantity of cyclic shift configuration parameters. A cyclic shift configuration parameter or a cyclic shift index is used by the first communications device to determine a cyclic shift value.

P2 is a maximum communications device quantity that is indicated by the resource configuration information and that is for the first communications device configured with the first resource, or a resource index configured by the second communications device for the first communications device, or a maximum quantity of communications devices included in the first resource, or a quantity of communications devices included in the first resource, or a maximum quantity of resource indexes configured by the second communications device, or a quantity of resource indexes configured by the second communications device, or a maximum quantity of resources configured by the second communications device, or a quantity of resources configured by the second communications device.

In an embodiment, the first information includes the DMRS configuration information. The DMRS configuration information indicates P1, and P1 may be the maximum cyclic shift index value of the first communications device (that is, a maximum quantity of cyclic shifts), or the cyclic shift index value configured by the second communications device for the first communications device (that is, a quantity of cyclic shifts configured by the second communications device for the first communications device). The first communications device may obtain the length of the first time window by using P1 in a predetermined manner of calculating the length of the first time window. The first information may further include the configuration information of the first resource. The configuration information of the first resource indicates P2, and P2 may be the maximum communications device quantity for the first communications device, or may be a resource index for configuring the first resource for the first communications device. The first communications device may obtain the length of the first time window by using P2 in the predetermined manner of calculating the length of the first time window. P1 may alternatively be the maximum quantity of cyclic shift indexes, or the maximum quantity of cyclic shift configuration parameters, or the quantity of cyclic shift configuration parameters. A manner of determining P1 may be configured based on a specific scenario.

The cyclic shift configuration parameter is described as follows: A value of a cyclic shift $\alpha_\lambda$ in a slot $n_s$ is calculated based on $\alpha_\lambda = 2\pi n_{cs,\lambda}/12$, where $$n_{cs,\lambda} = (n_{DMRS}^{(1)} + n_{DMRS,\lambda}^{(2)} + (1+\delta)n_{PN}(n_s)) \bmod 12.$$

Herein, $n_{DMRS}^{(1)}$ is provided by the second communications device by using higher layer signaling (for example, the cyclic shift (cyclic shift)), and $n_{DMRS,\lambda}^{(2)}$ is the cyclic shift configuration parameter. The maximum quantity of cyclic shift configuration parameters may be a possible maximum quantity of values of $n_{DMRS,\lambda}^{(2)}$, and the quantity of cyclic shift configuration parameters may be a possible quantity of values of $n_{DMRS,\lambda}^{(2)}$.

For example, the length of the first time window meets P1×Ld+B1 or P2×Ld+B2, where Ld is a search space length of the first communications device, or a predefined search space length, or a preset length. The length of the first time window may also be referred to as search space duration (Duration), a search space period (periodicity), a search space repetition quantity, or a physical downlink control channel (PDCCH) repetition quantity. For example, a physical downlink channel may include a machine type communication physical downlink control channel (MPDCCH) and an enhanced physical downlink control channel (ePDCCH).

B1 and B2 are preset values; or B1 or B2 is a value received from the second communications device. For example, the first information may include B1 and B2. B1 and B2 may be not limited to being added to the first information, and B1 and B2 may alternatively be added to other physical layer signaling or higher layer signaling. After P1×Ld is calculated, offsetting may be performed based on B1, to obtain the length of the first time window. Likewise, after P2×Ld is calculated, offsetting may be performed based on B2, to obtain the length of the first time window. In this embodiment of this application, the second communications device indicates P1 and P2 to the first communications device by using the first information. Therefore, the first communications device can calculate the length of the first time window, so that the first communications device monitors the first time window based on the determined length of the first time window.

In some embodiments of this application, the first communications device may calculate K1 or X1 by using a resource index of the first communications device or by using a DMRS cyclic shift index or a cyclic shift configuration parameter of the first communications device, or the first communications device may calculate K2 or X2 by using a resource index of the first communications device or by using a DMRS cyclic shift index of the first communications device. An example of calculating K1 and K2 is used. Specifically, K1 equals to q+i×Ld or q+j×Ld; and/or K2 meets q+i×Ld or q+j Ld, where q is a predefined integer greater than or equal to 0, or is a value received from the second communications device;

i is a resource index of the first communications device;

j is a DMRS cyclic shift index of the first communications device; and

Ld is the search space length of the first communications device or the predefined search space length.

The DMRS configuration information indicates j, and j may be a cyclic shift index value configured by the second communications device for the first communications device. The first communications device may obtain the start location of the first time window by using j in a predetermined manner of calculating K1 and K2. The first information may further include the configuration information of the first resource. The configuration information of the first resource indicates i, and i may be a resource index for configuring the first resource for the first communications device. The first communications device may obtain the start location of the first time window by using i in the predetermined manner of calculating K1 and K2. In a scenario in which a plurality of communications devices share the first resource, each communications device may determine a start location of a first time window that belongs to the communications device. Therefore, the second communications device may configure a start location of a first time window for each first communications device. This can avoid mutual interference caused when the plurality of communications devices perform monitoring at a start location of a same time window, resolve a problem of a time window collision in the shared resource, improve system reliability, and increase resource utilization.

In some embodiments of this application, in addition to operation 201 and operation 202 performed by the second communications device in this embodiment of this application, the information processing method performed by the second communications device may further include the following operations.

The second communications device determines a start location of a search space of the first communications device in the first time window. The first time window includes the one or more search spaces, or the first time window includes search spaces of one or more first communications devices.

The second communications device sends second information to the first communications device. The second information is used to indicate the start location of the search space of the first communications device in the first time window.

The first time window may include the one or more search spaces. The first communications device may monitor the start location of the search space in the first time window. The second communications device may determine the start location of the search space of the first communications device in the first time window, and then the second communications device sends the second information to the first communications device. Therefore, after receiving the second information, the first communications device may determine the start location of the search space of the first communications device in the first time window according to the indication of the second information. For example, the start location of the search space of the first communications device in the first time window may be the start location of the first time window, or the start location of the search space of the first communications device in the first time window may be a location obtained after the start location of the first time window is offset by a second value. The start location of the first time window may be determined according to the foregoing method, or may be determined according to a currently existing method. This is not limited herein. For example, the second value may be determined based on the DMRS configuration parameter of the first communications device and/or the configuration parameter of the first resource. Therefore, in a scenario in which a plurality of communications devices share the first resource, start locations of search spaces of the communications devices in the first time window are different, so that the plurality of communications devices are prevented from being conflicted with each other.

211: The first communications device receives the first information from the second communications device.

In an embodiment of this application, the first communications device and the second communications device may communicate with each other. For example, if the second communications device sends the first information, the first communications device may receive the first information from the second communications device, and then the first communications device parses the first information. For descriptions of the first information, refer to the descriptions of the first information provided from the perspective of the second communications device.

212: The first communications device determines, based on the first information, that the start location of the first time window is the $K1^{th}$ time unit after the start location of the first resource or the start location of the first time window is the $K2^{th}$ time unit after the end location of the first resource, where the first resource is a resource used by the first communications device to transmit data, and K1 and K2 are positive integers.

In an embodiment of this application, the first communications device obtains the first information from the second communications device, and the first communications device may determine the start location of the first time window based on the first information sent by the second communications device. A time window may also be referred to as a time period. For example, the time window may be a search space window, a monitoring time window, or a control information monitoring time window. The first search time window means that the second communications device may send the control information in the time period (in the time window), and the first communications device monitors, in the time period, the control information sent by the second communications device. The first time window may include the one or more search spaces. A search space is a set of time resources and frequency resources. The start location of the first time window is a start location at which the first communications device may monitor the control information. In other words, the first communications device may monitor the control information or monitor the search space at the start location of the first time window, or the first communications device may start to monitor the control information in the search space at the start location of the first time window.

The start location of the first time window may be a time unit after the start location of the first resource. For example, the start location of the first time window is the $K1^{th}$ time unit after the start location of the first resource, and K1 indicates a quantity of time units. For example, if K1 is equal to 6, it indicates that the start location of the first time window is a sixth time unit after the start location of the first resource.

In some embodiments of this application, the $K1^{th}$ time unit after the start location of the first resource may be a first time unit after a quantity "first value" of time units after the start location of the first resource. The first value is X1. The first value may be sent by the second communications device to the first communications device, or may be predefined. The first communications device determines that the first time unit after the X1 time units after the start location of the first resource is the $K1^{th}$ time unit after the start location of the first resource. Alternatively, the $K1^{th}$ time unit after the start location of the first resource may be a first valid time unit after the X1 time units after the start location of the first resource. The first communications device determines that the first valid time unit after the X1 time units after the start location of the first resource is the $K1^{th}$ time unit after the start location of the first resource. A valid time unit may be a BL/CE subframe.

Alternatively, the start location of the first time window may be a time unit after the end location of the first resource. For example, the start location of the first time window is the $K2^{th}$ time unit after the end location of the first resource, and K2 indicates a quantity of time units. For example, if K2 is equal to 4, it indicates that the start location of the first time window is a fourth time unit after the start location of the first resource. For another example, K1 may be equal to K2, or K1 may not be equal to K2. Specifically, K1 and K2 need to be determined based on an application scenario.

In some embodiments of this application, the $K2^{th}$ time unit after the end location of the first resource may be a first time unit after X2 time units after the end location of the first resource. The first value is X2. X2 may be sent by the second communications device to the first communications device, or may be predefined. The first communications device determines that the first time unit after the X2 time units after the end location of the first resource is the K2$^{th}$ time unit after the end location of the first resource. Alternatively, the K2$^{th}$ time unit after the end location of the first resource may be a first valid time unit after the X2 time units after the end location of the first resource. The first communications device determines that the first valid time unit after the X2 time units after the end location of the first resource is the K2$^{th}$ time unit after the end location of the first resource. A valid time unit may be a BL/CE subframe.

In this embodiment of this application, operation 212 in which the first communications device determines, based on the first information, that the start location of the first time window is the K1$^{th}$ time unit after the start location of the first resource or is the K2$^{th}$ time unit after the end location of the first resource includes:

When the first information includes the first value, the first communications device determines that the start location of the first time window is the K1$^{th}$ time unit after the start location of the first resource, where K1 is determined by the first communications device based on the first value; or when the first information does not include the first value, the first communications device determines that the start location of the first time window is the K2$^{th}$ time unit after the end location of the first resource, where K2 is a preset value, or K2 is a value received from the second communications device.

The first information indicates the start location of the first time window in a plurality of manners. For example, the first information may include the first value, or the first information may not include the first value, and the second communications device may indicate two implementations of the start location of the first time window based on the fact indicating whether the first information includes the first value. For example, the second communications device determines that the start location of the first time window is after the start location of the first resource, and the second communications device determines that the first information includes the first value; or the second communications device determines that the start location of the first time window is after the end location of the first resource, and the second communications device determines that the first information does not include the first value. Therefore, after receiving the first information, the first communications device may monitor whether the first information includes the foregoing first value, to determine a specific implementation of the start location of the first time window in the foregoing two implementations. In this embodiment of this application, the first value may be referred to as a first parameter. The first value may be determined based on K1. For example, the second communications device determines K1, and then determines the first value based on K1. For example, K1 has a one-to-one correspondence with the first value, and the second communications device may determine the first value based on the correspondence.

Further, in some embodiments of this application, the first value is K1, in other words, the second communications device may determine that the first value is equal to K1. Therefore, if the first information includes the first value, the first communications device may obtain the first value from the first information, and the first communications device may further determine that K1 is the first value included in the first information, so that the first communications device determines that the start location of the first time window is the K1$^{th}$ time unit after the start location of the first resource.

In some embodiments of this application, the first value is X1. The first value may be sent by the second communications device to the first communications device. The first communications device determines that the first time unit after the X1 time units after the start location of the first resource is the K1$^{th}$ time unit after the start location of the first resource; or the first communications device determines that the first valid time unit after the X1 time units after the start location of the first resource is the K1$^{th}$ time unit after the start location of the first resource. A valid time unit may be a BL/CE subframe.

In some other embodiments of this application, the first value is M1, and M1 is greater than 0 and less than or equal to 1. K1 is determined based on M1 and a configuration parameter of the first resource. The configuration parameter of the first resource is a parameter configured for the first resource. For example, the configuration parameter of the first resource may be a parameter configured by the second communications device for the first communications device for using the first resource. The first information may include M1. Therefore, after the first communications device obtains M1 from the first information, the first communications device may calculate K1 by using M1 and the configuration parameter of the first resource in a predetermined manner of generating K1, so that the first communications device determines that the start location of the first time window is the K1$^{th}$ time unit after the start location of the first resource.

Further, in some embodiments of this application, the configuration parameter of the first resource includes at least one of the following parameters: a period N1 of the first resource, a repetition quantity N2 of the first resource, and a quantity N3 of time units included in the first resource. N1 may be the period of the first resource that is configured by the second communications device, N2 is the repetition quantity of the first resource that is configured by the second communications device, and N3 is the quantity that is of time units included in the first resource and that is configured by the second communications device. Therefore, the first communications device may obtain K1 by using N1, N2, or N3 in the predetermined manner of generating K1.

For example, K1 may meet at least one of the following three relationships: M1×N1+A1, M1×N2+A2, or M1×N3+A3, where A1, A2, and A3 are preset values; or A1, A2, or A3 is a value received by the first communications device from the second communications device. For example, A1 to A3 are predetermined offsets. A1, A2, and A3 may alternatively be values received by the first communications device from the second communications device. For example, the first information may include A1, A2, and A3. A1, A2, and A3 may be not limited to being added to the first information, and A1, A2, and A3 may alternatively be added to other physical layer signaling or higher layer signaling. After M1×N1 is calculated, offsetting may be performed based on A1, to obtain K1. Likewise, after M1×N2 is calculated, offsetting may be performed based on A2, to obtain K1; or after M1×N3 is calculated, offsetting may be performed based on A3, to obtain K1. In this embodiment of this application, the second communications device indicates M1 to the first communications device by using the first information. Therefore, the first communications device can calculate K1, so that the first communications device determines that the start location of the first time window is the K1$^{th}$ time unit after the start location of the first resource.

Another similar manner may alternatively be used on a basis of the foregoing manner of calculating K1. For example, K1 equals to M1×(N1+A1), M1×(N2+A2), or M1×(N3+A3). Values of A1 to A3 are not limited.

In some other embodiments of this application, the first value is M1, and M1 is greater than or equal to 0 and less than or equal to 1. X1 is determined based on M1 and the configuration parameter of the first resource. The configuration parameter of the first resource is a parameter configured for the first resource. For example, the configuration parameter of the first resource may be a parameter configured by the second communications device for the first communications device for using the first resource. The first information may include M1. Therefore, after the first communications device obtains M1 from the first information, the first communications device may calculate X1 by using M1 and the configuration parameter of the first resource in the predetermined manner of generating K1 or X1, so that the first communications device determines that the start location of the first time window is the first valid time unit after the X1 time units after the start location of the first resource, that is, the K1$^{th}$ time unit. The first time unit after the X1 time units after the start location of the first resource is the K1$^{th}$ time unit after the start location of the first resource; or the first valid time unit after the X1 time units after the start location of the first resource is the K1$^{th}$ time unit after the start location of the first resource. The first communications device determines that the first valid time unit after the X1 time units after the start location of the first resource is the K1$^{th}$ time unit after the start location of the first resource. A valid time unit may be a BL/CE subframe.

Further, in some embodiments of this application, the configuration parameter of the first resource includes at least one of the following parameters: a period N1 of the first resource, a repetition quantity N2 of the first resource, and a quantity N3 of time units included in the first resource. N1 may be the period of the first resource that is configured by the second communications device, N2 is the repetition quantity of the first resource that is configured by the second communications device, and N3 is the quantity that is of time units included in the first resource and that is configured by the second communications device. Therefore, the first communications device may obtain X1 by using N1, N2, or N3 in the predetermined manner of generating X1.

For example, X1 may meet at least one of the following three relationships: M1×N1+A1, M1×N2+A2, or M1×N3+A3. For example, after M1×N1 is calculated, offsetting may be performed based on A1, to obtain X1. Likewise, after M1×N2 is calculated, offsetting may be performed based on A2, to obtain X1; or after M1×N3 is calculated, offsetting may be performed based on A3, to obtain X1. In this embodiment of this application, the second communications device indicates M1 to the first communications device by using the first information. Therefore, the first communications device can calculate K1, so that the first communications device determines that the start location of the first time window is the K1$^{th}$ time unit after the start location of the first resource.

It should be noted that, because M1 is greater than or equal to 0 and less than or equal to 1, X1 is calculated based on M1×N1+A1, M1×N2+A2, M1×N3+A3, or the like. Therefore, when transmission channel quality of the first communications device is relatively poor, the first communications device may perform a plurality of repeated transmissions to achieve success in transmission. Currently, the first communications device further may monitor a search space window on a fourth subframe after the end of the PUR.

In this case, the first communications device may monitor the search space window for a very long time before receiving downlink control information of the second communications device. Consequently, power consumption of the first communications device is greatly wasted. Because M1 is greater than 0 and less than or equal to 1, the first time window starts to be monitored on a first valid subframe after (M1×N1+A1) time units, (M1×N2+A2) time units, or (M1×N3+A3) time units after the start location of the first resource. Therefore, power consumption of the first communications device is not wasted.

Another similar manner may alternatively be used on a basis of the foregoing manner of calculating X1. For example, X1 meets M1×(N1+A1), M1×(N2+A2), or Mix (N3+A3). Values of A1 to A3 are not limited.

In an embodiment of this application, operation 212 in which the first communications device determines, based on the first information, that the start location of the first time window is the K1$^{th}$ time unit after the start location of the first resource or is the K2$^{th}$ time unit after the end location of the first resource includes:

When the first information indicates that the first communications device can perform early transmission termination, the first communications device determines that the start location of the first time window is the K1$^{th}$ time unit after the start location of the first resource, where K1 is a preset value, or K1 is a value received from the second communications device; or when the first information indicates that the first communications device cannot perform early transmission termination, the first communications device determines that the start location of the first time window is the K2$^{th}$ time unit after the end location of the first resource, where K2 is a preset value, or K2 is a value received from the second communications device.

In an early transmission termination scenario, the second communications device further may indicate whether the first communications device can perform early transmission termination. Therefore, in this embodiment of this application, whether early transmission termination can be performed may be associated with the start location of the first time window, and the second communications device only may indicate, to the first communications device, the fact indicating whether early transmission termination can be performed. Therefore, after the first communications device receives the first information, the first communications device may learn of the fact that is indicated by the second communications device and that indicates whether early transmission termination can be performed, and the first communications device determines, based on the association relationship between the fact indicating whether early transmission termination can be performed and the start location of the first time window, that the start location of the first time window is after the start location of the first resource or the start location of the first time window is after the end location of the first resource.

In an embodiment of this application, "whether early transmission termination can be performed" may also be referred to as "whether early transmission termination can be enabled", and enabling early termination may also be understood as that the second communications device (e.g., E-UTRAN) indicates that the second communications device may send an uplink HARQ-ACK feedback or an uplink grant for a new transmission to complete acknowledgment for early termination of a PUSCH transmission or an explicit PUSCH transmission. The second communications device may indicate whether a function of performing early transmission termination is enabled, so that the first communications device can determine the start location of the first time window. Therefore, the second communications device does not need to separately indicate the start location of the first time window. This reduces signaling overheads, and improves performance of a communications system.

In some embodiments, when the first information indicates that the first communications device can perform early transmission termination, the first communications device determines that the start location of the first time window is the first time unit after the X1 time units after the start location of the first resource or the start location of the first time window is the first valid time unit after the X1 time units after the start location of the first resource. A valid time unit may be a BL/CE subframe. X1 may be predefined, or may be configured by the second communications device.

When the first information indicates that the first communications device cannot perform early transmission termination, the first communications device determines that the start location of the first time window is the first time unit after the X2 time units after the start location of the first resource or the start location of the first time window is the first valid time unit after the X2 time units after the start location of the first resource. A valid time unit may be a BL/CE subframe. X2 may be predefined, or may be configured by the second communications device.

It should be noted that K1 or X1 may alternatively be determined in a predefined manner, for example, may be determined based on the configuration parameter of the first resource and the first value. The first value is predefined. For example, the first value is 0.25 or 0.5. The configuration parameter of the first resource includes at least one of the following parameters: a period N1 of the first resource, a repetition quantity N2 of the first resource, and a quantity N3 of time units included in the first resource. Another similar manner may alternatively be used on a basis of the foregoing manner of calculating K1 or X1. For example, K1 equals to M3×N1+A1, M3×N2+A2, or M3×N3+A3. Values of A1 to A3 are not limited. M3 is a predefined first value.

In some embodiments of this application, operation 212 in which the first communications device determines, based on the first information, that the start location of the first time window is the K1$^{th}$ time unit after the start location of the first resource or is the K2$^{th}$ time unit after the end location of the first resource includes:

When the first information indicates that the start location of the first time window is after the start location of the first resource, the first communications device determines that the start location of the first time window is the K1$^{th}$ time unit after the start location of the first resource, where K1 is a preset value, or K1 is a value sent by the second communications device to the first communications device; or when the first information indicates that the start location of the first time window is after the end location of the first resource, the first communications device determines that the start location of the first time window is the K2$^{th}$ time unit after the end location of the first resource, where K2 is a preset value, or K2 is a value sent by the second communications device to the first communications device.

The first information may alternatively be dedicated information that is generated by the second communications device and that is used to indicate the start location of the first time window. For example, the first information indicates that the start location of the first time window is after the start location of the first resource; or the first information indicates that the start location of the first time window is after the end location of the first resource. Therefore, the first communications device may receive the first information from the second communications device, and the first communications device determines, based on indication content included in the first information, that the start location of the first time window is after the start location of the first resource or the start location of the first time window is after the end location of the first resource.

In some embodiments, the first information indicates that the start location of the first time window is after the start location of the first resource, and the first communications device determines that the start location of the first time window is the first time unit after the X1 time units after the start location of the first resource or the start location of the first time window is the first valid time unit after the X1 time units after the start location of the first resource. A valid time unit may be a BL/CE subframe. X1 may be predefined, or may be configured by the second communications device.

The first information indicates that the start location of the first time window is after the end location of the first resource, and the first communications device determines that the start location of the first time window is the first time unit after the X2 time units after the end location of the first resource or the start location of the first time window is the first valid time unit after the X2 time units after the end location of the first resource. A valid time unit may be a BL/CE subframe. X2 may be predefined, or may be configured by the second communications device.

For different implementations of the foregoing first information, for example, the first information may be used to indicate whether the start location of the first time window is after the start location or the end location of the first resource, or the first information is used to indicate whether early transmission termination is enabled. If the first information indicates that the start location of the first time window is after the start location of the first resource or indicates that early transmission termination is enabled, the first time window is on a K1$^{th}$ subframe after a start resource of the first resource. If the first information indicates that the start location of the first time window is after the end location of the first resource or indicates that early transmission termination is disabled (not enabled), the start location of the first time window is on a K2$^{th}$ subframe after the end location of the first resource. K1 and K2 may be the same or may be different, which may be determined with reference to an application scenario. The second communications device indicates the start location of the first time window to the first communications device by using the first information. Therefore, the first communications device parses the first information, and obtains the start location of the first time window according to the indication of the second communications device, so that the start location of the first time window can be monitored in time. This avoids a case in which early transmission termination is completed but no time window is monitored.

In some embodiments of this application, in addition to operation 211 and operation 212 performed by the first communications device in this embodiment of this application, the information processing method performed by the first communications device may further include the following operations.

The first communications device receives the second information from the second communications device. The second information is used to indicate the start location of the search space of the first communications device in the first time window. The first time window includes the one or more search spaces.

The first communications device determines the start location of the search space of the first communications device in the first time window based on the second information.

The first time window may include the one or more search spaces. The first communications device may monitor the start location of the search space in the first time window. The second communications device may determine the start location of the search space of the first communications device in the first time window, and then the second communications device sends the second information to the first communications device. Therefore, after receiving the second information, the first communications device may determine the start location of the search space of the first communications device in the first time window according to the indication of the second information. For example, the start location of the search space of the first communications device in the first time window may be the start location of the first time window, or the start location of the search space of the first communications device in the first time window may be a location obtained after the start location of the first time window is offset by a second value. For example, the second value may be determined based on the DMRS configuration parameter of the first communications device and/or the configuration information parameter of the first resource. Therefore, in a scenario in which a plurality of communications devices share the first resource, start locations of search spaces of the communications devices in the first time window are different, so that the plurality of communications devices are prevented from being conflicted with each other.

203: The second communications device sends the control information to the first communications device based on the start location of the first time window.

In an embodiment of this application, after the second communications device indicates the start location of the first time window to the first communications device, the second communications device may further send the control information to the first communications device based on the start location of the first time window. Because the first communications device has determined the start location of the first time window, the first communications device may monitor, based on the start location of the first time window, the control information sent by the second communications device, so that the first communications device obtains the control information of the second communications device. For example, the control information is used to indicate whether data transmitted by the first communications device is successfully transmitted, or the control information is used to indicate scheduling information of a physical uplink shared channel of the first communications device, or the control information is used to indicate a rollback of the first communications device, or the control information is used to indicate the first communications device to perform retransmission on a next first resource.

213: The first communications device monitors, based on the determined start location of the first time window, the control information sent by the second communications device.

In an embodiment of this application, after the second communications device indicates the start location of the first time window to the first communications device, the second communications device may further send the control information to the first communications device based on the start location of the first time window. Because the first communications device has determined the start location of the first time window, the first communications device may monitor, based on the start location of the first time window, the control information sent by the second communications device, so that the first communications device obtains the control information of the second communications device. For example, the control information is used to indicate whether data transmitted by the first communications device is successfully transmitted, or the control information is used to indicate scheduling information of a physical uplink shared channel of the first communications device, or the control information is used to indicate a rollback of the first communications device, or the control information is used to indicate the first communications device to perform retransmission on a next first resource.

It may be learned from example descriptions of the foregoing embodiments that the first communications device receives the first information from the second communications device; the first communications device determines, based on the first information, that the start location of the first time window is the $K1^{th}$ time unit after the start location of the first resource or the start location of the first time window is the $K2^{th}$ time unit after the end location of the first resource, where the first resource is a resource used by the first communications device to transmit data, and K1 and K2 are positive integers; and the first communications device monitors, based on the determined start location of the first time window, the control information sent by the second communications device. In this embodiment of this application, the second communications device may indicate, by using the first information, that the start location of the first time window is the $K1^{th}$ time unit after the start location of the first resource or the start location of the first time window is the $K2^{th}$ time unit after the end location of the first resource. Therefore, the first communications device may determine, according to the indication of the second communications device, that the start location of the first time window is the $K1^{th}$ time unit after the start location of the first resource or the start location of the first time window is the $K2^{th}$ time unit after the end location of the first resource. The start location of the first time window may be indicated by the second communications device to the first communications device. The start location of the first time window may be after the start location of the first resource. This is applicable to a case in which the first communications device monitors the first time window in an early transmission termination scenario, and avoids a problem that a time window cannot be monitored. Alternatively, the start location of the first time window may be after the end location of the first resource other than the start location of the first resource. This improves efficiency of monitoring the first time window by the first communications device.

To better understand and implement the foregoing solutions in the embodiments of this application, the following uses corresponding application scenarios as examples for specific description.

An example in which the first communications device is UE and the second communications device is a base station is used below to describe a procedure of interaction between the UE and the base station.

1. The base station determines first information.

2. The base station sends the downlink first information to the UE.

The first information includes one or more of the following information: a first parameter, DMRS configuration information, and resource configuration information.

3. The UE receives the first information sent by the base station.

An example in which the first information is the first parameter, the DMRS configuration information, or the resource configuration information is used for descriptions below.

When the first information is the first parameter, the descriptions are provided below.

The first parameter is used to indicate the UE to determine a start location of a search space window. For example, the first parameter may be further used to determine a start location of a search space in a search space window. The start location of the search space in the search space window may be referred to as a "start location of the search space" for short.

Figure 3:
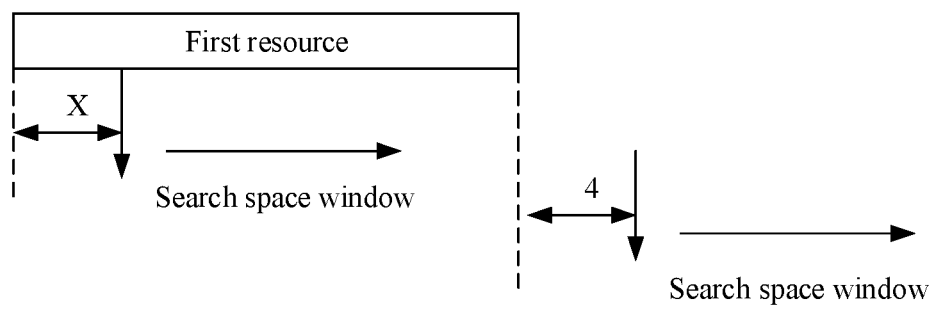
FIG. 3 is a schematic diagram of a start location of a search space window according to an embodiment of this application.

FIG. 3 is a schematic diagram of a start location of a search space window according to an embodiment of this application. For example, the first parameter may be a first value x, and the value x is a positive integer greater than or equal to 1. The UE determines, based on the first parameter, that the start location of the search space window is an $x^{th}$ subframe after a first location (for example, a first subframe or a last subframe) of a first resource (for example, a PUR). It should be noted that a subframe may be understood as a valid subframe or an absolute subframe. Similarly, the search space window may be understood as a time period for monitoring a search space. To be specific, a first search space may be monitored in the time period. The search space window is merely an example name. The search space window may alternatively be named as a search space time length, a search space time period, or the like. This is not specifically limited herein.

For example, the first parameter may alternatively be a second value y, y is M1, and y is greater than or equal to 0 and less than or equal to 1. The UE determines the start location of the search space window based on the second value y. The first parameter may be a period of the first resource, a repetition quantity of the first resource, or a quantity of absolute subframes included in the first resource. For example, if the first parameter is the repetition quantity N, the start location of the search space is an $(N*y)^{th}$ subframe after the first location of the first resource.

For example, when the base station configures the first parameter, the search space window starts from a first location of the PUR. When the base station does not configure the first parameter, the search space window starts from a second location of the PUR. The first location and the second location are different. Optionally, the first location is an $x^{th}$ subframe (or an $(N*y)^{th}$ subframe) after a PUR start subframe (which may also be referred to as a first subframe of a PUR resource or a fourth subframe of the PUR resource), and the second location is a $q^{th}$ subframe after an end subframe of the PUR resource (which may also be referred to as a last subframe or an $N^{th}$ subframe, where N is a PUR repetition quantity), where q is predefined. For example, q=4. Optionally, q is determined based on the DMRS configuration information (such as cyclic shift information) and/or the allocated resource configuration information (such as a used resource index).

A manner of determining the search space window when the first information is the DMRS configuration information and/or the resource configuration information is described below by using an example.

For example, a length of the search space or a length of the search space window is determined based on a (maximum) quantity of UEs in the first resource, in other words, the length of the search space or the length of the search space window is associated with the (maximum) quantity of UEs in the first resource. For example, the length of the search space or the length L of the search space window is L=N*Ld, where Ld is a first length. For example, the first length is a length of a search space of a first type (for example, a UE specific PUR), or the first length is a predefined time window length. Optionally, the (maximum) quantity of UEs in the first resource may be predefined. For example, N=8. Alternatively, the quantity of UEs in the first resource may be configured by the base station. For example, the resource configuration information includes information about the quantity. The (maximum) quantity of UEs in the first resource may also be understood as a (maximum) quantity of UEs that share the first resource, or may be understood as a (maximum) quantity of DMRS cyclic shifts.

For example, the start location of the search space or the search space window is determined based on the first information. For example, the start location of the search space or the search space time window is determined based on a first DMRS configuration. For example, the first configuration is a cyclic shift, such as an index (index) i corresponding to the DMRS cyclic shift. For example, the first configuration is an orthogonal cover code (orthogonal cover code, OCC), such as an index i corresponding to the OCC.

For example, the search space or the search space window of the first resource may be L=N*Ld, where Ld is the first length, and N is a total quantity of UEs in the first resource. In this case, a location of the search time window or the search space of the UE is a location of a search space whose index is i, or the start location is (i-1)*Ld. Optionally, the location is determined relative to a start location or an end location of the first resource.

Optionally, the UE further receives third information. The third information is used to indicate whether the UE enables early data termination or indicate whether the start location of the search space of the UE is relative to a PUR start location or a PUR end location. For example, the location of the search time window or the search space of the UE is the location whose index is i; or the start location is (i-1)*Ld; or a search space offset is related to the first information, and the offset is used to indicate the start location of the search space.

In an embodiment, the location of the search space or the search space window is determined relative to the start location or the end location of the first resource, and the UE further receives fourth information. The fourth information is used to indicate whether the UE enables early data termination or indicate whether the start location of the search space of the UE is relative to the PUR start location or the PUR end location.

For example, the start location of the search space or the start location of the search space window of the UE is configurable, and is determined based on the first information. Optionally, the start location is q+i*Ld. For example, q=4. Herein, i is determined based on a UE resource (the PUR resource configured for the UE) or a DMRS configuration (for example, a DMRS cyclic shift index). For example, i is a UE resource index or a DMRS cyclic shift index.

For example, a frequency resource used by the search space of the UE is determined based on the first information. For example, a system bandwidth includes K frequency locations. If the resource index configured by the UE is i or the DMRS cyclic shift index is i, an index of the frequency resource used by the search space of the UE is i.

4. The UE determines the first information, and determines, based on the first information, that the search space of the UE is a PUR search space.

5. The UE monitors control information based on the determined search space.

The solution in this embodiment of this application may also be applied to compatibility between another communications system and another system, for example, compatibility between an NR system and an enhanced machine type communications (enhanced machine type communications, eMTC) system or compatibility between a further enhanced machine type communications (Further eMTC, FeMTC) system.

In this embodiment of this application, whether the start location of the PUR search space is at the start location or end location of the PUR resource is implicitly indicated by whether the start location of the search space window being configured. This enables a function of performing early transmission termination, reduces signaling overheads, and improves system performance. Combining a start location of a search space with a DMRS or PUR resource configuration resolves a problem of a search space collision in a shared resource, improves system reliability, and increases resource utilization Embodiment 1

During currently preconfigured transmission, a plurality of users can share a same transmission resource. In a signal transmission process, a channel state of a user continuously changes. In this case, a transmission repetition quantity continuously changes accordingly. However, a size of a shared preconfigured resource is fixed. Consequently, when a transmission repetition quantity of the user is excessively large, the preconfigured resource cannot meet a transmission requirement of the user. However, when a channel change causes reduction of a transmission repetition quantity, if the user still shares one preconfigured resource with a user with a relatively large repetition quantity, the user still occupies the shared resource, but there are few resources actually used. Consequently, a relatively severe resource waste is caused.

This embodiment of this application provides the following solution:

A second communications device sends first indication information to a first communications device. The first indication information is used to indicate a first quantity of times and/or a second quantity of times, and the first quantity of times is less than the second quantity of times.

In some embodiments of this application, the first indication information is the first quantity of times and/or the second quantity of times.

In some other embodiments of this application, the first indication information indicates a first parameter and/or a second parameter. The second communications device determines the first quantity of times based on the first parameter and a first signal transmission repetition quantity of the first communications device, and/or the second communications device determines the second quantity of times based on the second parameter and the first signal transmission repetition quantity of the first communications device. For example, the second communications device determines the first quantity of times based on a product of the first parameter and the first repetition quantity, and determines the second quantity of times based on the second parameter and the first repetition quantity. Optionally, the first repetition quantity is a repetition quantity of configuring a PUR for the first time, or the first repetition quantity may be a length of a first resource (a quantity of included subframes, or a quantity of included valid subframes, or a quantity of included BL/CE subframes), or the first repetition quantity may be a maximum length of the first resource (a quantity of included subframes, or a quantity of included valid subframes, or a quantity of included BL/CE subframes).

The signal transmission repetition quantity of the first communications device is greater than or equal to the first quantity of times and is less than or equal to the second quantity of times, and the second communications device receives a signal from the first communications device by using the first resource.

Alternatively, the signal transmission repetition quantity of the first communications device is greater than or equal to the first quantity of times, and the second communications device receives a signal from the first communications device by using the first resource.

Alternatively, the signal transmission repetition quantity of the first communications device is less than or equal to the second quantity of times, and the second communications device receives a signal from the first communications device by using the first resource.

In an embodiment of this application, the first communications device receives the first indication information sent by the second communications device. The first indication information is used to indicate the first quantity of times and/or the second quantity of times, and the first quantity of times is less than the second quantity of times.

The signal transmission repetition quantity of the first communications device is greater than or equal to the first quantity of times and is less than or equal to the second quantity of times, and the first communications device determines to send a signal by using the first resource.

Alternatively, the signal transmission repetition quantity of the first communications device is greater than or equal to the first quantity of times, and the first communications device determines to send a signal by using the first resource.

Alternatively, the signal transmission repetition quantity of the first communications device is less than or equal to the second quantity of times, and the first communications device determines to send a signal by using the first resource.

The first communications device sends a signal to the second communications device by using the first resource.

The first quantity of times may also be referred to as a first length, and the second quantity of times may also be referred to as a second length. The signal may be one or more of a physical uplink shared channel, uplink data, an uplink sounding reference signal, and an uplink demodulation reference signal.

In some embodiments of this application, the repetition transmission quantity of the first communications device is greater than the second quantity of times, and the first communications device initiates random access, or the first communications device performs early data transmission (Early data transmission), or the first communications device releases the first resource.

In some embodiments of this application, the second communications device further sends second indication information to the first communications device, and the first communications device receives the second indication information. The repetition transmission quantity of the first communications device is greater than the second quantity of times, and the second indication information indicates that the first communications device initiates random access, or the second indication information indicates that the first communications device performs early data transmission, or the second indication information indicates that the first communications device releases the first resource.

In some embodiments of this application, the second communications device further sends third indication information to the first communications device, and the first communications device receives the third indication information. The repetition transmission quantity of the first communications device is less than the first quantity of times, the third indication information indicates that the first communications device transmits a signal by using a third resource, and the first resource and the third resource are different resources.

In some embodiments of this application, the repetition transmission quantity of the first communications device is less than the first quantity of times, the first communications device transmits a signal by using a third resource, and the first resource and the third resource are different resources.

For example, the first resource and the second resource are PUR resources.

For a periodic service, to reduce resource overheads, shorten a data transmission delay, and implement energy saving, a service may be transmitted on a predefined resource, in other words, the terminal device may transmit uplink information on the preconfigured resource without requiring DCI dynamic scheduling. The uplink information may include one or more of data, control information, and a reference signal. A specific form of the uplink information is not specifically limited herein. In addition, it should be noted that a preconfigured uplink resource (PUR) is merely an example name. Essentially, a network device configures the first resource, and a terminal device may transmit the uplink information on the first resource without requiring dynamic scheduling or downlink control information scheduling by the network device. The resource may alternatively have another name. For example, the resource may be a configuration grant resource. If the configuration grant resource may also implement a function implemented by the first resource in this embodiment of this application, the configuration grant resource may also be understood as the first resource in this embodiment of this application. For ease of description, the first resource is referred to as a preconfigured resource in this embodiment of this application.

For example, a base station sends first indication information, and the first indication information is used to indicate a first quantity of times (length) or a second quantity of times (length), and the first length is less than the second length.

For example, when a repetition quantity of a user is greater than the first length and/or less than the second length, a signal is transmitted by using the first resource.

For example, when the transmission repetition quantity of the user is greater than the second length, the user initiates random access or early data transmission, and/or releases the first resource. For example, when the transmission repetition quantity of the user is greater than the second length, the user transmits a signal by using a second resource, and the first resource and the second resource are different and both are preconfigured resources.

For example, when the repetition quantity is less than the first length, the user transmits a signal by using a third resource, and the first resource and the third resource are different.

When the repetition quantity of the user is relatively large, it is no longer suitable to transmit a signal on a currently shared resource. Therefore, EDT or RACH is sent for fallback, or a resource with a relatively long resource length is used to transmit a signal. This can avoid a problem that a user cannot transmit a signal, and increase a transmission success probability. When the repetition quantity is relatively small, a transmission resource is switched, and a same resource may be allocated to users with relatively small repetition quantities. This implements full use of resources, and avoids a waste.

Embodiment 2

Currently, a communications system may support user fallback. However, how to indicate a user to perform fallback is not resolved. This embodiment of this application may further resolve the problem of how to indicate the user to perform fallback.

This embodiment of this application provides the following solution:

A second communications device sends second indication information to a first communications device. The second indication information is used to indicate the first communications device to perform fallback, and/or perform random access, and/or perform early data transmission or retransmission.

In an embodiment of this application, the first communications device receives the second indication information sent by the second communications device. The second indication information is used to indicate the first communications device to perform fallback, and/or perform random access, and/or perform early data transmission or retransmission.

The first communications device performs fallback, and/or performs random access, and/or performs early data transmission or retransmission according to the indication of the second indication information.

For example, a base station sends second indication information, and the second indication information is used to indicate the user to perform fallback, and/or perform random access, and/or perform early data transmission or retransmission.

In an embodiment, the base station indicates the second indication information by using a first subfield. For example, the first field includes two bits, a first state (for example, 00) indicates retransmission or random access, a second state (01) indicates early data transmission, and a third state (10) indicates retransmission or next PUR retransmission. Alternatively, the first field includes one bit, a first state indicates random access or early data transmission, and a second state indicates retransmission or next PUR retransmission. Optionally, the first field is a TA adjustment field or a field used for TA adjustment, and the field is the first state to indicate user fallback.

In an embodiment, the base station indicates the second indication information by using a first field set and a second field. The first field set includes one or more fields. The one or more fields of the first field set are set as follows A first state set indicates that the downlink control information is used to indicate fallback or indicate user random access or early data transmission, and/or the second state indicates that the downlink control information is used for non-fallback, ACK feedback, or the like. The first field set is a first state set, and the second field indicates the user to perform random access or early data transmission or retransmission. For example, the first field set includes one field, the field includes one bit, and the field is 1 to indicate that the downlink control information is used to indicate fallback or indicate the user to perform random access or early data transmission. Optionally, the first field set includes one or more of the following fields: A third field is used to indicate a PUR transmission state, and the transmission state includes successful ACK transmission or retransmission; a fourth field is used to indicate resource allocation; and a fifth field is used to indicate an MCS. The first state set of the first field set is: All bits of the third field are set to 0, all bits of the fourth field are set to 1, and all bits of the fifth field are set to 1. The second field includes two bits, a first state (for example, 00) indicates random access, a second state (01) indicates early data transmission, and a third state (10) indicates retransmission or next PUR retransmission. Alternatively, the second field includes one bit, a first state indicates random access or early data transmission, and a second state indicates retransmission or next PUR retransmission.

In this embodiment of this application, signaling is designed to indicate the user fallback and indicate whether the user falls back to the EDT or the RACH. This improves indication flexibility. In addition, DCI for ACK feedback/scheduling and retransmission and DCI for indicating fallback may be effectively distinguished through field division. This improves indication accuracy and improves DCI indication flexibility.

Embodiment 3

Currently, a communications system supports scheduling and retransmission. However, how to indicate a used transmission resource during scheduling and retransmission is still not resolved.

A second communications device sends downlink control information to a first communications device. The downlink control information includes a resource allocation field and/or a first field. The first field and the resource allocation field are used to indicate a resource used by the first communications device to transmit a signal.

The first communications device receives the downlink control information sent by the second communications device, and the first communications device determines the resource allocation field and/or the first field based on the downlink control information. The first field and the resource allocation field are used to indicate a resource used by the first communications device to transmit a signal.

For example, the resource allocation field is a first state, and the resource allocation field indicates, in a PUR range, a resource used by the first communications device to transmit a signal; or the resource allocation field is a first state, and the resource allocation field indicates a resource used by the first communications device to transmit a signal by using a PUR.

For example, the first field is a first state, and the resource allocation field indicates, in a first frequency domain range, a resource used by the first communications device to transmit a signal; or the first field is a second state, and the resource allocation field indicates, in a second frequency domain range, a resource used by the first communications device to transmit a signal. The first frequency domain range and the second frequency domain range are different. That the first frequency domain range and the second frequency domain range are different means that at least one subcarrier belongs to the first frequency domain but does not belong to the second frequency domain. Optionally, the first frequency domain range includes an entire bandwidth or a first narrowband, and the second frequency domain range includes a PUR resource.

For example, a base station sends downlink control information to a user, and the user receives the downlink control information. The downlink control information includes a resource allocation field and/or a first field. The first field and the resource allocation field are used to indicate a resource.

For example, the resource allocation field is a first state, and an allocated resource indicated by the field is a PUR resource or a resource configured by first information.

For example, the first field is a first state, and the resource allocation field indicates a transmission resource in a first frequency domain range; or the first field is a second state, and the resource allocation field indicates a transmission resource in a second frequency domain range. The first frequency domain range and the second frequency domain range are different. Optionally, the first frequency domain range includes an entire bandwidth range or a first narrowband, and the second frequency domain range includes a PUR resource.

For example, the resource allocation field indicates a frequency resource in a second frequency range, and the second frequency range is a PUR resource.

During scheduling and retransmission, a PUR resource is idle. In this case, the PUR resource may be allocated to the user for scheduling and retransmission. Therefore, the resource allocation field may be used to indicate whether to use the PUR resource, and one field is used to indicate the allocated resource is in a specific bandwidth or in a PUR resource range. Resource utilization is increased by reusing the PUR resource, and flexibility is improved by introducing an indication field into DCI.

Embodiment 4

When a plurality of users shares a PUR resource, demodulation reference signals (DMRS) need to be orthogonal to each other or have less correlation with each other. However, in a scenario of allocating two subcarriers, a problem of DMRS orthogonality is not resolved by using a related technology.

This embodiment of this application provides the following solution:

A second communications device sends a first message to a first communications device. The first message includes first indication information, and the first indication information is used to indicate a first sequence and/or a second sequence.

The first communications device receives the first message from the second communications device. The first message includes the first indication information, and the first communications device determines the first sequence and/or the second sequence based on the first indication information.

Optionally, the first sequence and/or the second sequence each are/is a DMRS sequence.

In some embodiments of this application, when one resource unit includes three subcarriers, in other words, when $M_{sc}^{RU}=3$, two of the three subcarriers are used, and the first sequence $\bar{r}_{u1}(n)$ and the second sequence $\bar{r}_{u2}(n)$ are defined as follows:

$$\bar{r}_{u1}(n) = \frac{1}{\sqrt{2}}(1+j)(1-2c(n))w(n \bmod 16),$$

$$0 \le n < N_{rep}^{PUSCH} M_{slots}^{UL} M_{RU}; \text{ and}$$

-continued $$\bar{r}_{u2}(n) = (-1)^n\left(\frac{1}{\sqrt{2}}(1+j)(1-2c(n))w(n\bmod 16)\right),$$

$$0 \le n < N_{rep}^{PUSCH}M_{slots}^{UL}M_{RU}.$$

Herein, c(n) is a predefined sequence, an initialization sequence is $c_{init}=35$, and any one of the three parameters $N_{rep}^{PUSCH}$, $M_{slots}^{UL}$ and $M_{RU}$ may be predefined or may be configured by the second communications device.

In addition, w(n mod 16) is determined according to Table 1, where u is determined by the first communications device based on the first indication information. For example, the first indication information indicates a first parameter, the first parameter is u, and the first communications device determines u based on the first parameter. For example, the first indication information indicates a second parameter, and the first communications device determines u based on the second parameter and a first rule. For example, the first rule is u=(($N_{ID}^{cell}$+x1)mod16)+x2.

Herein, x1 is determined based on the second parameter or the second parameter is x1, and x2 is predefined, for example, 0; or x2 is determined based on the second parameter or the second parameter is x2, and x1 is predefined, for example, 0; or x2 and x1 are determined based on the second parameter or the second parameter indicates both x1 and x2.

$N_{rep}^{PUSCH}$, $M_{slots}^{UL}$, and $M_{RU}$ may be predefined or may be configured by the second communications device, and w(n) is configured by the second communications device or is determined in a predefined manner. Optionally, the first indication information indicates to enable PUR resource sharing.

The first message does not include the first indication information, or the first indication information indicates a second state. When one resource unit includes three subcarriers, in other words, when $M_{SC}^{RU}=3$, two of the three subcarriers are used, and the first sequence $\bar{r}_{u1}(n)$ and the second sequence $\bar{r}_{u2}(n)$ are defined as follows:

$$\bar{r}_{u1}(n) = \frac{1}{\sqrt{2}}(1+j)(1-2c(n))w(n\bmod 16),$$

$$0 \le n < N_{rep}^{PUSCH}M_{slots}^{UL}M_{RU}; \text{ and}$$

$$\bar{r}_{u2}(n) = (-1)^n\left(\frac{1}{\sqrt{2}}(1+j)(1-2c(n))w(n\bmod 16)\right),$$

$$0 \le n < N_{rep}^{PUSCH}M_{slots}^{UL}M_{RU}.$$

Herein, c(n) is a predefined sequence, an initialization sequence is $c_{init}=35$, any one of the three parameters $N_{rep}^{PUSCH}$, $M_{slots}^{UL}$, and $M^{RU}$ may be predefined or may be configured by the second communications device, and w(n)

Table 1 is a table of values of w(n)

| u | w(0), . . . , w(15) |
|---|---|
| 0  | 1  1  1  1  1  1  1  1  1  1  1  1  1  1  1  1 |
| 1  | 1 -1  1 -1  1 -1  1 -1  1 -1  1 -1  1 -1  1 -1 |
| 2  | 1  1 -1 -1  1  1 -1 -1  1  1 -1 -1  1  1 -1 -1 |
| 3  | 1 -1 -1  1  1 -1 -1  1  1 -1 -1  1  1 -1 -1  1 |
| 4  | 1  1  1  1 -1 -1 -1 -1  1  1  1  1 -1 -1 -1 -1 |
| 5  | 1 -1  1 -1 -1  1 -1  1  1 -1  1 -1 -1  1 -1  1 |
| 6  | 1  1 -1 -1 -1 -1  1  1  1  1 -1 -1 -1 -1  1  1 |
| 7  | 1 -1 -1  1 -1  1  1 -1  1 -1 -1  1 -1  1  1 -1 |
| 8  | 1  1  1  1  1  1  1  1 -1 -1 -1 -1 -1 -1 -1 -1 |
| 9  | 1 -1  1 -1  1 -1  1 -1 -1  1 -1  1 -1  1 -1  1 |
| 10 | 1  1 -1 -1  1  1 -1 -1 -1 -1  1  1 -1 -1  1  1 |
| 11 | 1 -1 -1  1  1 -1 -1  1 -1  1  1 -1 -1  1  1 -1 |
| 12 | 1  1  1  1 -1 -1 -1 -1 -1 -1 -1 -1  1  1  1  1 |
| 13 | 1 -1  1 -1 -1  1 -1  1 -1  1 -1  1  1 -1  1 -1 |
| 14 | 1  1 -1 -1 -1 -1  1  1 -1 -1  1  1  1  1 -1 -1 |
| 15 | 1 -1 -1  1 -1  1  1 -1 -1  1  1 -1  1 -1 -1  1 |

In some other embodiments of this application, the first message includes the first indication information, or the first indication information indicates a first state. When one resource unit includes three subcarriers, in other words, when $M_{sc}^{RU}=3$, two of the three subcarriers are used, and the first sequence $\bar{r}_{u1}(n)$ and the second sequence $\bar{r}_{u2}(n)$ are defined as follows:

$$\bar{r}_{u1}(n) = \frac{1}{\sqrt{2}}(1+j)(1-2c(n))w(n\bmod 16),$$

$$0 \le n < N_{rep}^{PUSCH}M_{slots}^{UL}M_{RU}; \text{ and}$$

$$\bar{r}_{u2}(n) = (-1)^{n+1}\left(\frac{1}{\sqrt{2}}(1+j)(1-2c(n))w(n\bmod 16)\right),$$

$$0 \le n < N_{rep}^{PUSCH}M_{slots}^{UL}M_{RU}.$$

Herein, c(n) is a predefined sequence, an initialization sequence is $c_{init}=35$, any one of the three parameters is configured by the second communications device or is determined in a predefined manner.

The first indication information indicates different w(n) or indicates different manners of generating the first sequence and the second sequence, so that DMRSs between different users are orthogonal, and interference between the users is reduced.

Embodiment 5

Currently, open-loop power control is used during PUR transmission, and transmission may fail because there is no power control fed back by a base station.

This embodiment of this application provides the following solution:

A second communications device sends first power information and/or second power information to a first communications device. The first power information and/or the second power information are/is used to indicate a transmit power of the first communications device.

The first communications device receives the first power information and/or the second power information from the second communications device.

In some embodiments of this application, the first communications device determines a first power p based on the first power information; the first communications device receives first indication information; the first communications device discards remaining uplink data transmission based on the first indication information; and the first communications device determines that the first power is p−x. Herein, x is predefined, or is determined based on the second power information, and p is greater than or equal to 0.

In some embodiments of this application, the first communications device determines a first power p based on the first power information; the first communications device performs early transmission termination; and the first communications device determines that the first power is p−x. Herein, x is predefined, or is determined based on the second power information, and p is greater than or equal to 0.

In some embodiments of this application, the first communications device determines a first power p based on the first power information; the first communications device receives second indication information; the first communications device retransmits a first signal based on the second indication information; and the first communications device determines that the first power is p+x. Herein, x is predefined, or is determined based on the second power information, and p is greater than or equal to 0.

In some embodiments of this application, the first communications device determines a first power p based on the first power information; the first communications device retransmits a first signal, or the first communications device fails in transmission, or the first communications device receives one or more HARQ-NACKs (hybrid automatic repeat request-negative acknowledgment);

and the first communications device determines that the first power is p+x. Herein, x is predefined, or is determined based on the second power information, and p is greater than or equal to 0.

In some embodiments of this application, the first communications device determines a first power p based on the first power information; the first communications device receives one or more uplink scheduling and retransmission grants; and the first communications device determines that the first power is p+x. Herein, x is predefined, or is determined based on the second power information, and p is greater than or equal to 0.

In some embodiments of this application, the first communications device determines a first power p based on the first power information; the first communications device receives one or more uplink grants; and the first communications device determines that the first power is p+x. Herein, x is predefined, or is determined based on the second power information, and p is greater than or equal to 0.

For example, the first power information is configured by using higher layer signaling (such as a radio resource control (RRC) message, or a media access control element (MAC CE), and the second power information is configured by using physical layer signaling (such as downlink control information).

It should be noted that for ease of brief description, the foregoing method embodiments are represented as a series of actions. However, a person skilled in the art should appreciate that this application is not limited to the described order of the actions, because according to this application, some operations may be performed in other orders or simultaneously. In addition, it should be further appreciated by a person skilled in the art that the embodiments described in this specification belong to example embodiments, and the involved actions and modules are not necessarily required by this application.

To better implement the foregoing solutions in the embodiments of this application, the following further provides a related apparatus for implementing the foregoing solutions.

Figure 4:
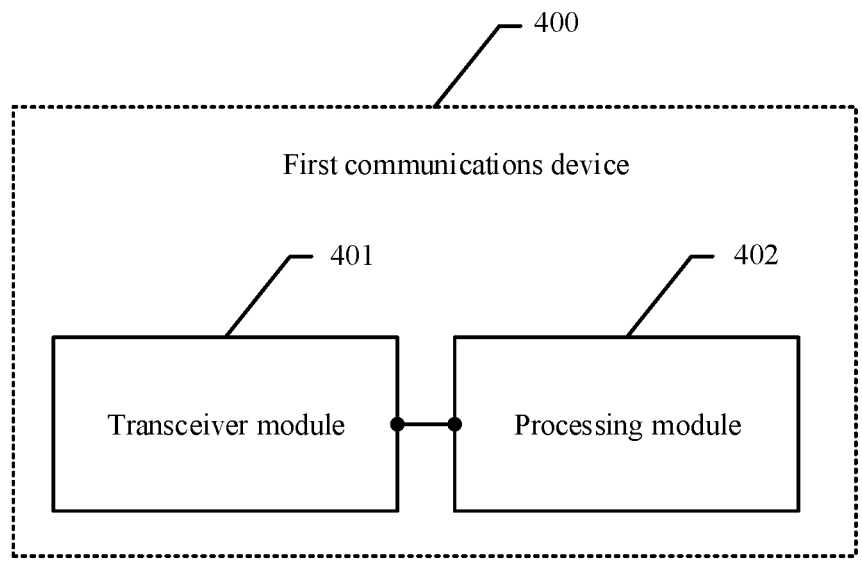
FIG. 4 is a schematic diagram of a composition structure of a first communications device according to an embodiment of this application.

FIG. 4 is a schematic diagram of a composition structure of a first communications device according to an embodiment of this application. The first communications device may be the foregoing terminal device. The first communications device 400 includes a transceiver module 401 and a processing module 402.

The transceiver module is configured to receive first information from a second communications device.

The processing module is configured to determine, based on the first information, that a start location of a first time window is a $K1^{th}$ time unit after a start location of a first resource or the start location of the first time window is a $K2^{th}$ time unit after an end location of the first resource, where the first resource is a resource used by the first communications device to transmit data, and K1 and K2 are positive integers.

The transceiver module is further configured to monitor, based on the determined start location of the first time window, control information sent by the second communications device.

In some embodiments of this application, the processing module is configured to: when the first information includes a first value, determine that the start location of the first time window is the $K1^{th}$ time unit after the start location of the first resource, where K1 is determined by the first communications device based on the first value; or when the first information does not include the first value, determine that the start location of the first time window is the $K2^{th}$ time unit after the end location of the first resource, where K2 is a preset value, or K2 is a value received from the second communications device.

In some embodiments of this application, the first value is K1.

In some embodiments of this application, the first value is M1, and K1 is determined based on M1 and a configuration parameter of the first resource.

In some embodiments of this application, the configuration parameter of the first resource includes: a period N1 of the first resource, a repetition quantity N2 of the first resource, and a quantity N3 of time units included in the first resource.

K1 equals to M1×N1+A1, M1×N2+A2, or M1×N3+A3, where

A1, A2, and A3 are preset values; or A1, A2, or A3 is a value received from the second communications device.

In some embodiments of this application, the processing module is configured to: when the first information indicates that the first communications device can perform early transmission termination, determine that the start location of the first time window is the $K1^{th}$ time unit after the start location of the first resource, where K1 is a preset value, or K1 is a value received from the second communications device; or when the first information indicates that the first communications device cannot perform early transmission termination, determine that the start location of the first time window is the $K2^{th}$ time unit after the end location of the first resource, where K2 is a preset value, or K2 is a value received from the second communications device.

In some embodiments of this application, the transceiver module is further configured to receive second information from the second communications device, where the second information is used to indicate a start location of a search space of the first communications device in the first time window, and the first time window includes one or more search spaces.

The processing module is further configured to determine the start location of the search space of the first communications device in the first time window based on the second information.

Figure 5:
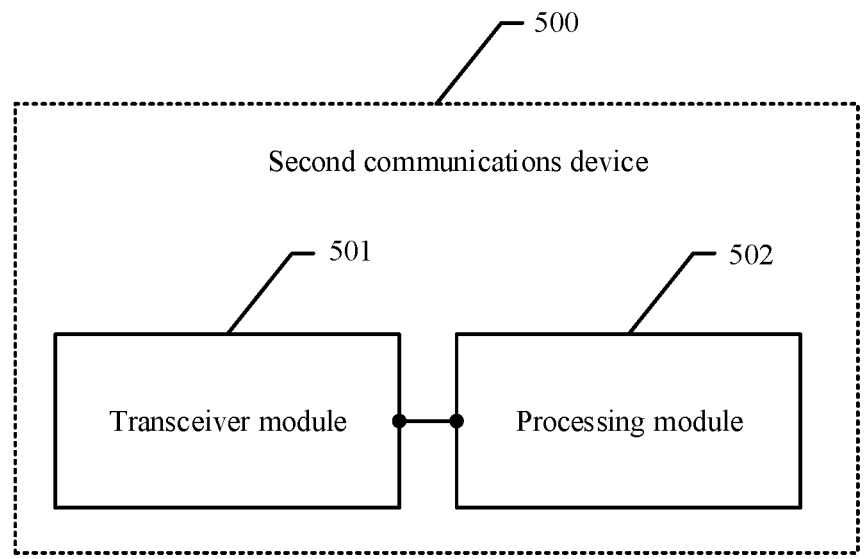
FIG. 5 is a schematic diagram of a composition structure of a second communications device according to an embodiment of this application.

FIG. 5 is a schematic diagram of a composition structure of a second communications device according to an embodiment of this application. The second communications device may be the foregoing network device. The second communications device 500 includes a transceiver module 501 and a processing module 502.

The processing module is configured to determine that a start location of a first time window used to send control information is a $K1^{th}$ time unit after a start location of a first resource or the start location of the first time window is a $K2^{th}$ time unit after an end location of the first resource, where the first resource is a resource used by a first communications device to transmit data, and K1 and K2 are positive integers.

The transceiver module is configured to send first information to the first communications device, where the first information is used by the first communications device to determine the start location of the first time window.

The transceiver module is further configured to send the control information to the first communications device based on the start location of the first time window.

In some embodiments of this application, the processing module is further configured to: before the transceiver module sends the first information to the first communications device, determine that the start location of the first time window is after the start location of the first resource, determine a first value based on K1, and determine that the first information includes the first value; or determine that the start location of the first time window is after the end location of the first resource, and determine that the first information does not include the first value.

In some embodiments of this application, the processing module is further configured to: before the transceiver module sends the first information to the first communications device, determine that the first information is used to indicate that the first communications device can perform early transmission termination, and determine that the start location of the first time window is after the start location of the first resource; or determine that the first information is used to indicate that the first communications device cannot perform early transmission termination, and determine that the start location of the first time window is after the end location of the first resource.

In some embodiments of this application, the processing module is further configured to determine a start location of a search space of the first communications device in the first time window, where the first time window includes one or more search spaces.

The transceiver module is further configured to send second information to the first communications device, where the second information is used to indicate the start location of the search space of the first communications device in the first time window.

In some embodiments of this application, the first information includes DMRS configuration information and/or configuration information of the first resource.

The DMRS configuration information and/or the configuration information of the first resource are/is used by the first communications device to determine the start location of the first time window.

The DMRS configuration information and/or the configuration information of the first resource are/is used by the first communications device to determine a length of the first time window.

In some embodiments of this application, the length of the first time window meets P1×Ld+B1 or P2×Ld+B2, where
 P1 is a maximum cyclic shift index value indicated by the DMRS configuration information or a cyclic shift index value configured by the second communications device for the first communications device;
 P2 is a maximum communications device quantity that is indicated by the resource configuration information and that is for the first communications device configured with the first resource, or is a resource index configured by the second communications device for the first communications device;
 Ld is a search space length of the first communications device or a predefined search space length; and
 B1 and B2 are preset values; or
 B1 or B2 is a value received from the second communications device.

In some embodiments of this application, K1 equals to q+i×Ld or q+j×Ld; and/or
 K2 meets q+i×Ld or q+j×Ld, where
 q is a predefined integer greater than or equal to 0, or is a value received from the second communications device;
 i is a resource index of the first communications device;
 j is a DMRS cyclic shift index of the first communications device; and
 Ld is the search space length of the first communications device or the predefined search space length.

An embodiment of this application further provides a computer storage medium. The computer storage medium stores a program. The program is executed to perform some or all of the operations recorded in the method embodiments.

Figure 6:
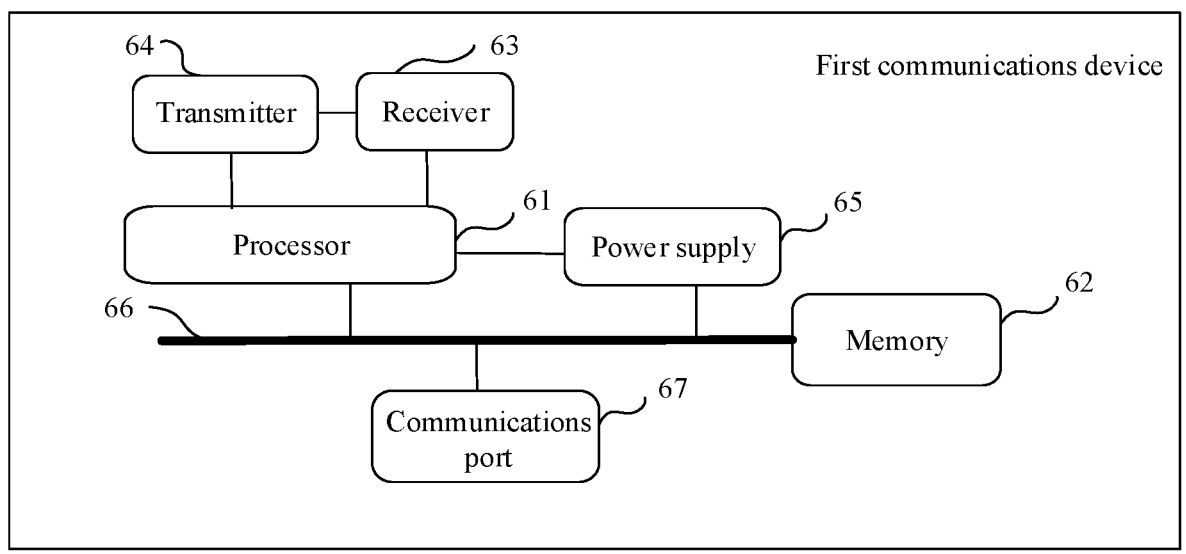
FIG. 6 is a schematic diagram of a composition structure of another first communications device according to an embodiment of this application.

FIG. 6 is a schematic diagram of a structure of another first communications device according to an embodiment of this application. The first communications device is a terminal device. The terminal device may include a processor 61 (for example, a CPU), a memory 62, a transmitter 64, and a receiver 63. The transmitter 64 and the receiver 63 are coupled to the processor 61. The processor 61 controls a sending action of the transmitter 64 and a receiving action of the receiver 63. The memory 62 may include a high-speed RAM memory, or may further include a non-volatile memory NVM, for example, at least one magnetic disk memory. The memory 62 may store various instructions, to complete various processing functions and implement the method operations in the embodiments of this application. Optionally, the terminal device in this embodiment of this application may further include one or more of a power supply 65, a communications bus 66, and a communications port 67. The receiver 63 and the transmitter 64 may be integrated into a transceiver of the terminal device, or may be a receive antenna and a transmit antenna that are independent of each other on the terminal device. The communications bus 66 is configured to implement communication connection between elements. The communications port 67 is configured to implement a connection and communication between the terminal device and another peripheral.

In an embodiment of this application, the memory 62 is configured to store computer executable program code. The program code includes instructions. When the processor 61 executes the instructions, the processor 61 is enabled to perform the processing action of the terminal device in the foregoing method embodiment shown in FIG. 2, and the transmitter 64 is enabled to perform the sending action of the terminal device in the foregoing method embodiment. Implementation principles and technical effects are similar. Details are not described herein again.

Figure 7:
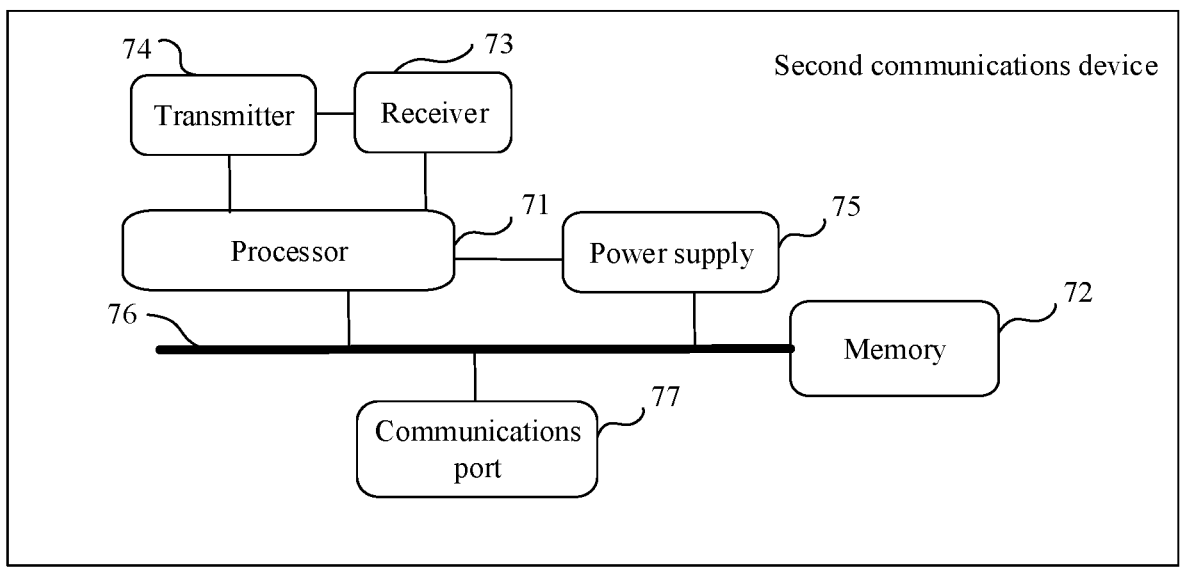
FIG. 7 is a schematic diagram of a composition structure of another second communications device according to an embodiment of this application.

FIG. 7 is a schematic diagram of a structure of another second communications device according to an embodiment of this application. The second communications device is a network device. The network device may include a processor (for example, a CPU) 71, a memory 72, a receiver 73, and a transmitter 74. The receiver 73 and the transmitter 74 are coupled to the processor 71. The processor 71 controls a receiving action of the receiver 73 and a sending action of the transmitter 74. The memory 72 may include a high-speed RAM memory, and may further include a non-volatile memory NVM, for example, at least one magnetic disk memory. The memory 72 may store various instructions, to complete various processing functions and implement the method operations in the embodiments of this application. Optionally, the network device in this embodiment of this application may further include one or more of a power supply 75, a communications bus 76, and a communications port 77. The receiver 73 and the transmitter 74 may be integrated into a transceiver of the network device, or may be a receive antenna and a transmit antenna that are independent of each other on the network device. The communications bus 76 is configured to implement communication connection between elements. The communications port 77 is configured to implement a connection and communication between the network device and another peripheral.

In an embodiment of this application, the memory 72 is configured to store computer executable program code. The program code includes instructions. When the processor 71 executes the instructions, the processor 71 is enabled to perform the processing action of the network device in the foregoing method embodiment shown in FIG. 2, and the transmitter 74 is enabled to perform the sending action of the network device in the foregoing method embodiment. Implementation principles and technical effects are similar. Details are not described herein again.

In another possible embodiment, when the second communications device is a chip in a terminal device or a network device, the chip includes a processing unit and a communications unit. The processing unit may be, for example, a processor. The communications unit may be, for example, an input/output interface, a pin, or a circuit. The processing unit may execute computer-executable instructions stored in a storage unit, so that a chip in the terminal performs the wireless communication method according to any one implementation of the first aspect. Optionally, the storage unit is a storage unit in the chip, for example, a register or a cache. Alternatively, the storage unit may be a storage unit that is in the terminal and that is located outside the chip, for example, a read-only memory (read-only memory, ROM) or another type of static storage device that may store static information and instructions, for example, a random access memory (random access memory, RAM).

The processor mentioned in any of the foregoing designs may be a general-purpose central processing unit (CPU), a microprocessor, an application-specific integrated circuit (ASIC), or one or more integrated circuits for controlling program execution of the wireless communication method according to the first aspect.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all the modules may be selected according to an actual need to achieve the objectives of the solutions of the embodiments. In addition, in the accompanying drawings of the apparatus embodiments provided in this application, connection relationships between modules indicate that the modules have communication connections with each other, which may be implemented as one or more communications buses or signal cables. A person of ordinary skill in the art may understand and implement various embodiments of the present disclosure.

Based on the descriptions of the foregoing implementations, a person skilled in the art may clearly understand that this application may be implemented by software in addition to universal hardware, or may be implemented by dedicated hardware, including an application-specific integrated circuit, a dedicated CPU, a dedicated memory, a dedicated component, and the like. Generally, any functions that can be performed by a computer program can be easily implemented by using corresponding hardware, and a hardware structure used to achieve a same function may be of various forms, for example, in a form of an analog circuit, a digital circuit, or a dedicated circuit. However, in this application, a software program implementation is a better implementation in most cases. Based on such an understanding, the technical solutions of this application essentially or the part contributing to the conventional technology may be implemented in a form of a software product. The computer software product is stored in a readable storage medium, for example, a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used for implementation, all or some of the embodiments may be implemented in a form of a computer program product.

The computer program product includes one or more computer instructions. When the computer program instructions are loaded and executed on a computer, all or some of the procedures or the functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media.

The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. An information processing method, comprising:
   receiving, by a first communications device, first information from a second communications device;
   determining, by the first communications device based on the first information, that a start location of a first time window is a $K1^{th}$ time unit after a start location of a first resource or the start location of the first time window is a $K2^{th}$ time unit after an end location of the first resource, wherein the first resource is a resource used by the first communications device to transmit data, and K1 and K2 are positive integers; and
   monitoring, by the first communications device based on the determined start location of the first time window, control information sent from the second communications device;
   wherein the determining by the first communications device based on the first information, that the start location of the first time window is the $K1^{th}$ time unit after the start location of the first resource or the start location of the first time window is the $K2^{th}$ time unit after the end location of the first resource comprises:
   in response to the first information indicating that early transmission termination is enabled, determining by the first communications device, that the start location of the first time window is the $K1^{th}$ time unit after the start location of the first resource; or
   in response to the first information indicating that early transmission termination is not enabled, determining, by the first communications device, that the start location of the first time window is the $K2^{th}$ time unit after the end location of the first resource.

2. The method according to claim 1, wherein the determining, by the first communications device based on the first information, that a start location of a first time window is a $K1^{th}$ time unit after a start location of a first resource or is a $K2^{th}$ time unit after an end location of the first resource comprises:
   when the first information comprises a first value, determining, by the first communications device, that the start location of the first time window is the $K1^{th}$ time unit after the start location of the first resource, wherein K1 is determined by the first communications device based on the first value; or
   when the first information does not comprise the first value, determining, by the first communications device, that the start location of the first time window is the $K2^{th}$ time unit after the end location of the first resource, wherein K2 is a preset value, or K2 is a value received from the second communications device.

3. The method according to claim 2, wherein the first value is K1.

4. The method according to claim 2, wherein the first value is M1, and K1 is determined based on M1 and a configuration parameter of the first resource.

5. The method according to claim 4, wherein the configuration parameter of the first resource comprises: a period N1 of the first resource, a repetition quantity N2 of the first resource, and a quantity N3 of time units comprised in the first resource; and
   K1 equals to: M1×N1+A1, M1×N2+A2, or M1×N3+A3, wherein A1, A2, and A3 are preset values; or A1, A2, or A3 is a value received from the second communications device.

6. An information processing method, comprising:
   determining, by a second communications device, that a start location of a first time window used to transmit control information is a $K1^{th}$ time unit after a start location of a first resource or the start location of the first time window is a $K2^{th}$ time unit after an end location of the first resource, wherein the first resource is a resource used by a first communications device to transmit data, and K1 and K2 are positive integers;
   transmitting, by the second communications device, first information to the first communications device, wherein the first information is used by the first communications device to determine the start location of the first time window; and
   transmitting, by the second communications device, the control information to the first communications device based on the start location of the first time window,
   wherein the first information indicates that early transmission termination is enabled and the start location of the first time window is the $K1^{th}$ time unit after the start location of the first resource; or
   wherein the first information indicates that early transmission termination is not enabled and the start location of the first time window is the $K2^{th}$ time unit after the end location of the first resource.

7. The method according to claim 6, wherein before the sending, by the second communications device, first information to the first communications device, the method further comprises:
   determining, by the second communications device, that the start location of the first time window is after the start location of the first resource, determining, by the second communications device, a first value based on K1, and determining, by the second communications device, that the first information comprises the first value; or
   determining, by the second communications device, that the start location of the first time window is after the end location of the first resource, and determining, by the second communications device, that the first information does not comprise the first value.

8. A communications device operating as a first communications device, comprising:
   at least one processor,
   a memory, coupled to the at least one processor, storing computer program instructions, which when executed by the at least on processor, cause the at least one processor to:
   receive first information from a second communications device;
   determine, based on the first information, that a start location of a first time window is a $K1^{th}$ time unit after a start location of a first resource or the start location of the first time window is a $K2^{th}$ time unit after an end location of the first resource, wherein the first resource is a resource used by the first communications device to transmit data, and K1 and K2 are positive integers; and
   monitor, based on the determined start location of the first time window, control information sent by the second communications device,
   wherein the determine, based on the first information, that the start location of the first time window is the $K1^{th}$ time unit after the start location of the first resource or the start location of the first time window is the K2$^{th}$ time unit after the end location of the first resource comprises:
in response to the first information indicating that early transmission termination is enabled, determining that the start location of the first time window is the K1$^{th}$ time unit after the start location of the first resource; or
in response to the first information indicating that early transmission termination is not enabled, determine that the start location of the first time window is the K2$^{th}$ time unit after the end location of the first resource.

9. The communications device according to claim 8, wherein the instructions cause the at least one processor to: when the first information comprises a first value, determine that the start location of the first time window is the K1$^{th}$ time unit after the start location of the first resource, wherein K1 is determined by the first communications device based on the first value; or when the first information does not comprise the first value, determine that the start location of the first time window is the K2$^{th}$ time unit after the end location of the first resource, wherein K2 is a preset value, or K2 is a value received from the second communications device.

10. The communications device according to claim 9, wherein the first value is K1.

11. The communications device according to claim 9, wherein the first value is M1, and K1 is determined based on M1 and a configuration parameter of the first resource.

12. The communications device according to claim 11, wherein the configuration parameter of the first resource comprises: a period N1 of the first resource, a repetition quantity N2 of the first resource, and a quantity N3 of time units comprised in the first resource; and
K1 equals to M1×N1+A1, M1×N2+A2, or M1×N3+A3, wherein
A1, A2, and A3 are preset values; or A1, A2, or A3 is a value received from the second communications device.

13. The communications device according to claim 8, wherein the instructions cause the at least one processor to: when the first information indicates that the first communications device is capable of performing early transmission termination, determine that the start location of the first time window is the K1$^{th}$ time unit after the start location of the first resource, wherein K1 is a preset value, or K1 is a value received from the second communications device; or when the first information indicates that the first communications device is not capable of performing perform early transmission termination, determine that the start location of the first time window is the K2$^{th}$ time unit after the end location of the first resource, wherein K2 is a preset value, or K2 is a value received from the second communications device.

14. A communications device operating as a second communications device, comprising:
at least one processor,
a memory, coupled to the at least one processor, storing computer program instructions, which when executed by the at least on processor, cause the at least one processor to:
determine that a start location of a first time window used to send control information is a K1$^{th}$ time unit after a start location of a first resource or the start location of the first time window is a K2$^{th}$ time unit after an end location of the first resource, wherein the first resource is a resource used by a first communications device to transmit data, and K1 and K2 are positive integers;
transmit first information to the first communications device, wherein the first information is used by the first communications device to determine the start location of the first time window; and
transmit the control information to the first communications device based on the start location of the first time window,
wherein the first information indicates that early transmission termination is enabled and the start location of the first time window is the K1$^{th}$ time unit after the start location of the first resource; or
wherein the first information indicates that early transmission termination is not enabled and the start location of the first time window is the K2$^{th}$ time unit after the end location of the first resource.

15. The communications device according to claim 14, wherein the instructions cause the at least one processor to: before sending the first information to the first communications device, determine that the start location of the first time window is after the start location of the first resource, determine a first value based on K1, and determine that the first information comprises the first value; or determine that the start location of the first time window is after the end location of the first resource, and determine that the first information does not comprise the first value.

16. The communications device according to claim 14, wherein the instructions further cause the at least one processor to: before sending the first information to the first communications device, determine that the first information is used to indicate that the first communications device is capable of performing early transmission termination, and determine that the start location of the first time window is after the start location of the first resource; or determine that the first information is used to indicate that the first communications device is not capable of performing early transmission termination, and determine that the start location of the first time window is after the end location of the first resource.

17. The communications device according to claim 14, wherein the first information comprises demodulation reference signal DMRS configuration information and/or configuration information of the first resource, wherein
the DMRS configuration information and/or the configuration information of the first resource is used by the first communications device to determine the start location of the first time window; and
the DMRS configuration information and/or the configuration information of the first resource is used by the first communications device to determine a length of the first time window.

18. The communications device according to claim 17, wherein the length of the first time window equals to P1×Ld+B1 or P2×Ld+B2, wherein
P1 is a maximum cyclic shift index value indicated by the DMRS configuration information or a cyclic shift index value configured by the second communications device for the first communications device;
P2 is a maximum communications device quantity that is indicated by the resource configuration information and that is for the first communications device configured with the first resource, or is a resource index configured by the second communications device for the first communications device;
Ld is a search space length of the first communications device or a predefined search space length; and
B1 and B2 are preset values; or
B1 or B2 is a value received from the second communications device.

19. The communications device according to claim 18, wherein

K1 equals to $q+i \times Ld$ or $q+j \times Ld$; and/or

K2 equals to $q+i \times Ld$ or $q+j \times Ld$, wherein q is a predefined integer greater than or equal to 0, or is a value received from the second communications device;

i is a resource index of the first communications device;

j is a DMRS cyclic shift index of the first communications device; and

Ld is the search space length of the first communications device or the predefined search space length.

* * * * *

UNITED STATES PATENT AND TRADEMARK OFFICE
CERTIFICATE OF CORRECTION

PATENT NO. : 12,349,115 B2
APPLICATION NO. : 17/707341
DATED : July 1, 2025
INVENTOR(S) : Wenping Bi et al.

Page 1 of 1

It is certified that error appears in the above-identified patent and that said Letters Patent is hereby corrected as shown below:

In the Claims

In Column 52, Claim 8, Line 51, delete "by the at least on processor" and insert --by the at least one processor--.

In Column 53, Claim 8, Line 5, delete "is enabled, determining that" and insert --is enabled, determine that--.

In Column 54, Claim 17, Line 40, delete "signal DMRS configuration" and insert --signal (DMRS) configuration--.

Signed and Sealed this
Twenty-eighth Day of October, 2025

John A. Squires
*Director of the United States Patent and Trademark Office*